United States Patent
Chen et al.

(10) Patent No.: US 9,170,815 B2
(45) Date of Patent: *Oct. 27, 2015

(54) BITSTREAM BUFFER MANIPULATION WITH A SIMD MERGE INSTRUCTION

(71) Applicant: Intel Corporation, Santa Clara, CA (US)

(72) Inventors: Yen-Kuang Chen, Cupertino, CA (US); William W. Macy, Jr., Palo Alto, CA (US); Matthew Holliman, Sunnyvale, CA (US); Eric L. Debes, Santa Clara, CA (US); Minerva M. Yeung, Sunnyvale, CA (US); Huy V. Nguyen, Round Rock, TX (US); Julien Sebot, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/752,916

(22) Filed: Jan. 29, 2013

(65) Prior Publication Data

US 2013/0138917 A1    May 30, 2013

Related U.S. Application Data

(63) Continuation of application No. 13/668,418, filed on Nov. 5, 2012, which is a continuation of application No. 12/907,843, filed on Oct. 19, 2010, now Pat. No. 8,510,355, which is a continuation of application No.

(Continued)

(51) Int. Cl.
*G06F 5/01*     (2006.01)
*G06F 9/30*     (2006.01)

(Continued)

(52) U.S. Cl.
CPC .......... *G06F 9/30145* (2013.01); *G06F 9/3001* (2013.01); *G06F 9/3013* (2013.01);

(Continued)

(58) Field of Classification Search
None
See application file for complete search history.

(56) References Cited

U.S. PATENT DOCUMENTS 3,711,692  A    1/1973  Batcher
3,723,715  A    3/1973  Chen et al.

(Continued)

FOREIGN PATENT DOCUMENTS

EP    0130380 A2    1/1985
EP    0363 176      4/1990

(Continued)

OTHER PUBLICATIONS

Avaro, Olivier, et al., *MPEG-4 Systems Overview and Architecture*, woody.imag.fr/MPEG4/syssite/syspub/docs/tutorial/, May 28, 1998, pp. 1-71 plus Yahoo site ref.

(Continued)

*Primary Examiner* — David H Malzahn
(74) *Attorney, Agent, or Firm* — Vecchia Patent Agent, LLC

(57) ABSTRACT

Method, apparatus, and program means for performing bitstream buffer manipulation with a SIMD merge instruction. The method of one embodiment comprises determining whether any unprocessed data bits for a partial variable length symbol exist in a first data block is made. A shift merge operation is performed to merge the unprocessed data bits from the first data block with a second data block. A merged data block is formed. A merged variable length symbol comprised of the unprocessed data bits and a plurality of data bits from the second data block is extracted from the merged data block.

8 Claims, 18 Drawing Sheets

Related U.S. Application Data

10/612,542, filed on Jul. 1, 2003, now Pat. No. 7,818,356, which is a continuation-in-part of application No. 10/280,511, filed on Oct. 25, 2002, now Pat. No. 7,272,622, which is a continuation-in-part of application No. 09/952,891, filed on Oct. 29, 2001, now Pat. No. 7,085,795.

(51) Int. Cl.
| | | |
|---|---|---|
| *G06F 9/38* | (2006.01) | |
| *G06F 17/14* | (2006.01) | |
| *G06F 17/15* | (2006.01) | |
| *G06F 15/80* | (2006.01) | |

(52) U.S. Cl.
CPC ........ *G06F9/30014* (2013.01); *G06F 9/30018* (2013.01); *G06F 9/30025* (2013.01); *G06F 9/30032* (2013.01); *G06F 9/30036* (2013.01); *G06F 9/30109* (2013.01); *G06F 9/30112* (2013.01); *G06F 9/3816* (2013.01); *G06F 9/3885* (2013.01); *G06F 15/8007* (2013.01); *G06F 17/147* (2013.01); *G06F 17/15* (2013.01)

(56) References Cited

U.S. PATENT DOCUMENTS

| | | | |
|---|---|---|---|
| 4,139,899 A | 2/1979 | Tulpule et al. | |
| 4,161,784 A | 7/1979 | Cushing et al. | |
| 4,393,468 A | 7/1983 | New | |
| 4,418,383 A | 11/1983 | Doyle et al. | |
| 4,490,786 A | 12/1984 | Nakatani | |
| 4,498,177 A | 2/1985 | Larson | |
| 4,707,800 A | 11/1987 | Montrone et al. | |
| 4,771,379 A | 9/1988 | Ando et al. | |
| 4,903,228 A | 2/1990 | Gregoire et al. | |
| 4,989,168 A | 1/1991 | Kuroda et al. | |
| 5,019,968 A | 5/1991 | Wang et al. | |
| 5,081,698 A | 1/1992 | Kohn | |
| 5,095,457 A | 3/1992 | Jeong | |
| 5,168,571 A | 12/1992 | Hoover et al. | |
| 5,187,679 A | 2/1993 | Vassiliadis et al. | |
| 5,268,995 A | 12/1993 | Diefendorff et al. | |
| 5,321,810 A | 6/1994 | Case et al. | |
| 5,390,135 A | 2/1995 | Lee et al. | |
| 5,408,670 A | 4/1995 | Davies | |
| 5,423,010 A | 6/1995 | Mizukami | |
| 5,426,783 A | 6/1995 | Norrie et al. | |
| 5,465,374 A | 11/1995 | Dinkjian et al. | |
| 5,487,159 A | 1/1996 | Byers et al. | |
| 5,497,497 A | 3/1996 | Miller et al. | |
| 5,524,256 A | 6/1996 | Turkowski | |
| 5,572,334 A | 11/1996 | Tanaka | |
| 5,579,253 A | 11/1996 | Lee et al. | |
| 5,594,437 A | 1/1997 | O'Malley | |
| 5,625,374 A | 4/1997 | Turkowski | |
| 5,638,525 A | 6/1997 | Hammond et al. | |
| 5,666,298 A | 9/1997 | Peleg et al. | |
| 5,680,161 A | 10/1997 | Lehman et al. | |
| 5,740,394 A | 4/1998 | Minemura et al. | |
| 5,740,461 A | 4/1998 | Jaggar et al. | |
| 5,781,457 A | 7/1998 | Cohen et al. | |
| 5,790,839 A | 8/1998 | Luk et al. | |
| 5,818,739 A | 10/1998 | Peleg et al. | |
| 5,819,117 A | 10/1998 | Hansen | |
| 5,822,619 A | 10/1998 | Sidwell | |
| 5,838,984 A | 11/1998 | Nguyen et al. | |
| 5,857,114 A | 1/1999 | Kim | |
| 5,909,572 A | 6/1999 | Thayer et al. | |
| 5,933,650 A | 8/1999 | van Hook et al. | |
| 6,041,404 A | 3/2000 | Roussel et al. | |
| 6,115,812 A | 9/2000 | Abdallah et al. | |
| 6,192,467 B1 | 2/2001 | Abdallah et al. | |
| 6,195,741 B1 | 2/2001 | Asato | |
| 6,211,892 B1 | 4/2001 | Huff et al. | |
| 6,223,277 B1 | 4/2001 | Karguth | |
| 6,247,112 B1 | 6/2001 | Seki | |
| 6,288,723 B1 | 9/2001 | Huff et al. | |
| 6,381,690 B1 | 4/2002 | Lee | |
| 6,430,684 B1 | 8/2002 | Bosshart | |
| 6,438,638 B1 | 8/2002 | Jones et al. | |
| 6,484,255 B1 | 11/2002 | Dulong | |
| 6,542,541 B1 | 4/2003 | Luna et al. | |
| 6,546,480 B1 | 4/2003 | Mandavilli et al. | |
| 6,745,319 B1 | 6/2004 | Balmer et al. | |
| 6,781,589 B2 | 8/2004 | Macy et al. | |
| 6,816,961 B2 | 11/2004 | Rice et al. | |
| 7,085,795 B2 | 8/2006 | Debes et al. | |
| 7,272,622 B2 | 9/2007 | Sebot et al. | |
| 7,818,356 B2 * | 10/2010 | Chen et al. | 708/209 |
| 8,510,355 B2 * | 8/2013 | Chen et al. | 708/209 |
| 8,745,358 B2 * | 6/2014 | Sebot et al. | 712/22 |
| 8,782,377 B2 * | 7/2014 | Sebot et al. | 712/208 |
| 2001/0016902 A1 | 8/2001 | Abdallah et al. | |
| 2002/0002666 A1 | 1/2002 | Dulong et al. | |
| 2002/0112147 A1 | 8/2002 | Chennupaty et al. | |
| 2002/0144027 A1 | 10/2002 | Schmisseur | |
| 2002/0159529 A1 | 10/2002 | Wang et al. | |
| 2002/0172287 A1 | 11/2002 | Kim | |
| 2003/0084082 A1 | 5/2003 | Debes et al. | |
| 2003/0123748 A1 | 7/2003 | Sebot et al. | |
| 2003/0131030 A1 | 7/2003 | Sebot et al. | |
| 2003/0231711 A1 | 12/2003 | Zhang et al. | |
| 2004/0098556 A1 | 5/2004 | Buxton et al. | |
| 2004/0098567 A1 | 5/2004 | Hansen et al. | |
| 2004/0205323 A1 | 10/2004 | Hansen et al. | |
| 2005/0108312 A1 | 5/2005 | Chen | |
| 2005/0188182 A1 | 8/2005 | Hoyle et al. | |
| 2011/0035426 A1 | 2/2011 | Chen | |
| 2012/0233443 A1 | 9/2012 | Sebot | |
| 2013/0007417 A1 | 1/2013 | Sebot et al. | |
| 2013/0061024 A1 * | 3/2013 | Chen et al. | 712/210 |
| 2013/0061025 A1 * | 3/2013 | Chen et al. | 712/210 |
| 2013/0124824 A1 * | 5/2013 | Chen et al. | 712/22 |
| 2013/0138917 A1 * | 5/2013 | Chen et al. | 712/22 |
| 2013/0145120 A1 * | 6/2013 | Chen et al. | 712/22 |
| 2013/0145125 A1 * | 6/2013 | Chen et al. | 712/208 |
| 2013/0159672 A1 * | 6/2013 | Chen et al. | 712/204 |
| 2013/0185541 A1 * | 7/2013 | Chen et al. | 712/205 |
| 2013/0212359 A1 | 8/2013 | Sebot et al. | |

FOREIGN PATENT DOCUMENTS

| | | |
|---|---|---|
| EP | 0130 380 | 1/1995 |
| WO | WO 97/08608 | 3/1997 |
| WO | 03/038601 A1 | 5/2003 |
| WO | WO 03/038601 | 5/2003 |

OTHER PUBLICATIONS

Bierling, M., *Displacement Estimation by Hierarchical Blockmatching*, SPIE, vol. 1001, Visual Communications and Image Processing, May 1998, pp. 942-951.

Chan, Y.L and W.C. Siu, *Adaptive Multiple-Candidate Hierarchical Search for Block Matching Algorithm*, IEE Electronics Letters, vol. 31, No. 19, Sep. 14, 1995, pp. 1637-1639.

Chan, Yui-Lam and Wan-Chi Siu, *New Adaptive Pixel Decimation for Block Motion Vector Estimation*, IEEE Transactions on Circuits and Systems on Video Technology, vol. 6, No. 1, Feb. 1996, pp. 113-118.

Chen, Liang-Gee, Wai-Ting Chen, Yeu-Shen Jehng Tzi-Dar Chuieh, *An Efficient Parallel Motion Estimation Algorithm for Digital Image Processing*, IEEE Transactions on Circuits and Systems on Video Technology, vol. 1, No. 4, Dec. 1991, pp. 378-384.

Cheng, K.W., S.C. Chan, *Fast Block Marching Algorithms for Motion Estimation*, ICASSP96, 1996, pp. 2318ff.

Corral, Jesus, et al., *DLP+TLP Processors for the Next Generation of Media Workloads*, 0/7695-1019-1/01, IEEE, 2001, pp. 219-228.

Day, Neil, Ed., *Introduction to MPEG-7 (v.3.0)*, International Organization for Standardization, ISO/IEC JTC1/SC29/WG11, Coding of Moving Pictures and Audio, #N4032, Mar. 2001, pp. 1-10.

Dufaux, Frederic, et al., *Efficient, Robust, and Fast Global Motion Estimation for Video Coding*, 1057-7149/00, IEEE, 2000, pp. 497-501.

(56) References Cited

OTHER PUBLICATIONS

Eckart, Stefan, Chad Fogg, *ISO/IEC MPEG-2 Software Video Codec*, SPIE vol. 2419, Digital Video Compression: Algorithms and Technologies, 1995, San Jose, CA, 15 pages.

Edirisinghe, E.A., et al., *Shape Adaptive Padding for MPEG-4*, 0098 3063/00, IEEE, 2000, pp. 514-520.

Feng. J., Lo, K. T. Mehrpour, H. Karbowiak, A.E, *Adaptive Block-Matching Motion Estimation Algorithm for Video Coding*, IEE Electronics Letters, vol. 31, No. 18, 1995, pp. 1542-1543.

Furht, Botho, Joshua Greenberg, Raymond Westwater, *Motion Estimation Algorithm for Video Compression*, Kluwer Academic Publishers, Boston, 1997, pp. cover-vi, 11, 49-95.

Ghanbari, M., *The Cross-Search Algorithm for Motion Estimation*, IEEE Transactions on Communications, vol. 38, No. 7, Jul. 1990, pp. 950-953.

He, Zhongli, M.L. Liou, *A High Performance Fast Search Algorithm for Block Matching Motion Estimation*, IEEE Transactions on Circuits and Systems on Video Technology, vol. 7, No. 5, Oct. 1997, pp. 826-828.

He, Zhong-Li, M.L. Liou, *Design of Fast Motion Estimation Algorithm based on Hardware Consideration*, IEEE Transactions Circuits and Systems on Video Technology, vol. 7, No. 5, Oct. 1997, pp. 819-823.

Heising, G., et al., *MoMuSys: MPEG-4 Version 2 Video Reference Software Package*, AC098/H1H/WP5.1/DS/P/049/B1, 1998, Abstract and pp. 1-8.

Intel Corporation, *Block-Matching in Motion Estimation Alforithms Using Streaming SIMD Extensions 2 (SSE2)*, Vers. 2.0. Sep. 22, 2000, Order No. 248605-001, pp. 1-13, A-1, A-2.

International Organisation for Standardisation, *Optimization Model Version, 2.0*, ISO/IEC JTC1/SC29/WG11, Coding of Moving Pictures and Audio, #N3675, Oct. 2000, 12 pp.

International Organisation for Standardisation, *New MPEG-4 Profiles Under Consideration*, ISO/IEC JTC1/SC29/WG11, Coding of Moving Pictures and Audio, #N3932, Jan. 2001, pp. 1-35.

Jain, J., A. Jain, *Displacement Measurement and its Application in Interframe Image Coding*, IEEE Transactions on Communications, vol. 29, No. 12, Dec. 1981, pp. 1799-1808.

Ju, John C-H., et al., *A Fast Rate-Optimized Motion Estimation Algorithm for Low-Bit-Rate Video Coding*, 1051-8215/99, IEEE, 1999, pp. 994-1002.

Jung, Hae Mook, Duch Dong Hwang Coong Soo Park, Han Soo Kim, *An Annular Search Algorithm for Efficient Motion Estimation*, International Picture Coding Symposium, PCS96, 1996, pp. 171-174.

Kappagantula, S., K.R. Rao, *Motion Compensated Interframe Image Prediction*, IEEE Transactions on Communications, 33(9), Sep. 1985, pp. 1011-1015.

Kim, Joon-Seek, Rae-Hong Park, *A Fast Feature-Based Block Matching Algorithm Using Integral Projections*, IEEE Journal on Selected areas in communications, vol. 10, No. 5, Jun. 1992, pp. 968-971.

Kim, Michelle, Ed., *MPEG-4 Systems*, International Organization for Standardization, ISO/IEC JTC1/SC29/WG11, Coding of Moving Pictures and Audio, #N3383, Jun. 2000, pp. 1-19.

Kneip, Johannes, et al., *Applying and Implementing the MPEG-4 Multimedia Standard*, 0272-1732/99, IEEE, 1999, pp. 64-74.

Kneip, J. (Johannes), et al., *The MPEG-4 Video Coding Standard—a VLSI Point of View*, IEEE Workshop on Sigal Processing Systems (SIPS98), Oct. 8-10, 1998, pp. 43-52, A-1, A-2.

Koga, J., et al., *Motion Compensated Interframe Coding for Video Conferencing*, Proceedings of the National Telecommunications Conference, 1981, G5.3.1-5.3.3.

Koenen, Rob, Ed., *Overview of the MPEG-4 Standard*, International Organization for Standardization, ISO/IEC JTC1/SC29/WG11, Coding of Moving Pictures and Audio, #N4030, Mar. 2001, pp. 1-69.

Kuhn, P., *Algorithms, Complexity Analysis and VLSI Architectures for MPEG-4 Motion Estimation*, 1999 Kluwer Academic Publishers, Boston, pp. cover-vi, 15, 17-59, 107-109, 119-121, 147-167, and 189-204.

Kuhn, P., Stechele W., *Complexity Analysis of the Emerging MPEG-4 Standard as a Basis For VLSI Implementation*, vol. SPIE 3309 Visual Communications and Image Processing, San Jose, Jan. 1998, pp. 498-509.

Lee, Liang-Wei, Jhing-Fa Wang, Jau-Yien Lee, Jung-Dar Shie, *Dynamic Search-Window Adjustment and Interlaced Search Block-Matching Algorithm*, IEEE Transactions on circuits and systems for video technology, vol. 3, No. 1, Feb. 1993, pp. 85-87.

Lee, W., Y. Kim, R.J. Gove, C.J. Read, *Media Station 5000: Integrating Video and Audio*, IEEE Multimedia, vol. 1, No. 4, 1994, pp. 50-61.

Lee, Xiaobing, Ya-Qin Mang, *A Fast Hierarchical Motion-Compensation Scheme for Video Coding Using Block-Feature Matching*, IEEE Transactions on Circuits and Systems for Video Technology, vol. 6, No. 6, Dec. 1996, pp. 627-635.

Lengwehasatit, Krisda, et al., *A Novel Computationally Scalable Algorithm for Motion Estimation*, SPIE 3309 VCIP Visual Communications and Image processing, San Jose, CA, Jan. 1998, pp. 66-79.

Li, R., B. Zeng, M.L. Liu, *A New Three-Step Search Algorithm for Block Motion Estimation*, IEEE Transactions on Circuits and Systems on Video Technology, vol. 4, No. 4, Aug. 1994, pp. 438-442.

Li, W., E. Salari, *Successive Elimination Algorithm for Motion Estimation*, IEEE Trans. Image Processing, vol. 4, Jan. 1995, pp. 105-107.

Liang, Jie, et al., *Region-Based Video Coding with Embedded Zero-Trees*, 1068-0314/97, IEEE, 1997, p. 449.

Liu, B., A. Zaccarin, *New Fast Algorithms for the Estimation of Block Motion Vectors*, IEEE Transactions on Circuits and Systems on Video Technology, vol. 3, No. 2, Apr. 1993, pp. 148-157.

Liu, Lurng-Kuo, Ephraim Feig, *A Block-Based Gradient Descent Search Algorithm for Block-Based Motion Estimation in Video Coding*, IEEE Transactions on Circuits and Systems on Video Technology, vol. 6, No. 4, Aug. 1996, pp. 419-422.

Mo, Hyeon-Cheol, et al., *A High-Speed Pattern Decoder in MPEG-4 Padding Block Hardware Accelerator*, 0-7803-6685-9/01, IEEE, 2001, pp. II-197-II-200.

Moschetti, F., et al., *About Macroblock Subsampling for Motion Estimation on IA-64*, Proc. of 2001 IEEE Int'l. Conf. on Multimedia and Expo ((ICME 2001), Tokyo, Japan, Aug. 2001, 4 pp.

Moschetti, F., et al., *A Fast Block Matching for SIMD Processors Using Subsampling*, IEEE #0-7803-5482-6/99, pp. IV-321-IV-324, 2000.

Nam, Kwon Moon, Joon-Seek Kim, Rae-Hong Park, Young Serk Shim, *A Fast Hierarchical Motion Vector Estimation Algorithm Using Mean Pyramid*, IEEE Transactions on Circuits and Systems on Video Technology, vol. 5, No. 4, Aug. 1995, pp. 344-351.

Netravali, A., B. Haskell, *Digital Pictures Representation and Compression*, New York, Plenum, 1988, pp. cover-xv, 334-340, 537-542, and 354-355.

Pirsch, Peter, Nicolas Demassieux, Winfried Gehrke, *VLSI Architectures for Video Compression—A Survey*, Proceedings of the IEEE, vol. 83, No. 2, Feb. 1995, pp. 220-246.

Po, Lai-Man, Wing-Chung Ma. *A Novel Four-Step Search Algorithm for Fast Blockmatching*, IEEE Transactions on Circuits and Systems on Video Technology, vol. 6, No. 3, Jun. 1996, pp. 313-317.

Puri, A., H.M. Hang, D.L. Schilling, *An Efficient Blockmatching Algorithm for Motion Compensated Coding*, Proc. IEEE ICASSP, 1987, pp. 2.4.1-25.4.4.

Ragsdale, Gary L., et al, *Relationships of Popular Transmission Characteristics to Perceived Qualify for Digital Video Over ATM*, National Communications System, Technical Information Bulletin 99-2, Jan. 1999, 64 pp.

Ramkishor, K., et al., *Real Time Implementation of MPEG-4 Video Decoder on ARM7TDM1*, Proc. of 2001 Int'l. Symposium on Intelligent Multimedia, Video and Speech Processing, May 2-4, 2001, pp. 522-526.

Shi, Y.Q., X. Xia, *A Thresholding Multiresolution Block Matching Algorithm*, IEEE Transactions on Circuits and Systems on Video Technology, vol. 7, No. 2, Apr. 1997, pp. 437-440.

Sikora, Thomas, *MPEG Digital Video Coding Standards*, Preprint from Digital Consumer Electronics Handbook, 1$^{st}$ Ed., McGraw-Hill Book Co., Ch. 9, pp. 1-43.

(56) References Cited

OTHER PUBLICATIONS

Sikora, Thomas, *MPEG-1 and MPEG-2 Digital Video Coding Standards*, Preprint from Digital Consumer Electronics Handbook, 1st Ed., McGraw-Hill Book Co., pp. 1-43.
Sikora, Thomas, *The Structure of the MPEG-4 Video Coding Algorithm*, Preprint from Digital Consumer Electronics Handbook, 1st Ed., McGraw-Hill Book Co., pp. 1-16.
Song, Byung Cheol, Jong Beom Ra, *A Hierarchical Block Matching Algorithm Using Partial Distortion Criteria*, SPIE 3309 VCJP Visual Communications and Image Processing, 1998, San Jose, CA, pp. 88-95.
Srinivasan, Ram and K.R. Rao, *Predictive Coding Based on Efficient Motion Estimation*, IEEE Transactions on Circuits and Systems on Video Technology, vol. Com-33, No. 8, Aug. 1985, pp. 888-896.
Stolberg, H.-J., et al., *The M-Pire MPEG-4 Codec DSP and Its Macroblock Engine*, 0-7803-548206/99, IEEE, 2000, pp. II-192-II-195.
Tham, Jo Yew, et al., *Transactions Letters: A Novel Unrestricted Center-Biased Diamond Search Algorithm for Block Motion Estimation*, IEEE, 1051-8215/98, 1998, pp. 369-377.
van der Schaar, M., et al., *Near-Lossless Complexity-Scalable Embedded Compression Algorithm for Cost Reduction in DTV Receivers*, 0098 3063/00, IEEE, 7000, pp. 923-933.
Wang, Chung-Neng, et al., *Improved MPEG-4 Visual Texture Coding Using Double Transform Coding*, 0-7803-6685-9/01, IEEE, 2001, pp. V-227-V-230.
Westerink, P. H., et al., *Two-Pass MPEG02 Variable-Bit-Rate Encoding*, IBM J. Res. Develop, vol. 43, No. 4, Jul. 1999, pp. 471-488.
Wittenburg, J.P., et al., *HiPAR-DSP: A Parallel VLIW RISC Processor for Real Time Image Processing Applications*, (0-7803-4229-1/97) IEEE, 1997, pp. 155-162.
Xu, Jie-Bin, Lai-man Po, and Chok-Kwan Cheung, *A New Prediction Model Search Algorithm for Fast Block Motion Estimation*, IEEE Int. Conf. Image Processing, ICIP97, Santa Barbara, 1997, pp. 610-613.
Yu, Fengqi and Alan N. Wilson, Jr., *A Flexible Hardware-Oriented Fast Algorithm for Motion Estimation*, ICASSP97, 1997, pp. 2681ff.
Zhu, Shan, Kai-Kuang Ma, *A New Diamond Search Algorithm for Fast Block Matching*, IEEE Transactions on Circuits and Systems on Video Technology, vol. 9, No. 2, Feb. 2000, pp. 287-290.
Diefendorff, K., et al., "AltiVec Extension to PowerPC Accelerates Media Processing," IEEE, #0272-1732/00, 2000, pp. 85-95.
Philips Electronics, "TriMedia TM1000 Preliminary Data Book," 1997, 70 pgs.
"MIPS Digital Media Extension," Set Architecture Specification, Web Site—mips.com/MDMXspec.ps, Oct. 21, 1997, 8 pgs.
Hewlet Packard, "64-bit and Multimedia Extensions in the PA-RISC 2.0 Architecture", Microprocessors Precision Architecture, 1997, 18 pgs.
Kawakami, Y., et al., "A Single-Chip Digital Signal Processor for Voiceband Applications," IEEE, 1980 International Solid-Slate Circuits Conference, pp. 40-41, 1980.
Sun Microsystems, Inc., "UltraSPARC Multimedia Capabilities On-Chip Support for Real-Time Video and Advanced Graphics," SPARC Technology Business, Sep. 1994, 8 pgs.
Case, B., "Philips Hopes to Displace DSPs with VLIW, TriMedia Processors Aimed at Future Multimedia Embedded Apss," Microprocessor Report, Dec. 1994, pp. 12-18.
Gwennap, L., "New PA-RISC Processor Decodes MPEG Video, H's PA-7100LC Uses New Instructions to Eliminate Decoder Chip," Microprocessor Report, Jan. 1994, pp. 16-17.
Texas Instruments, "TMS320C2X User's Guide," 1993, pp. 3:2-3:11; 3:28-3:34; 4:1-4:22; 4:41; 4:103; 4:119-J;120; 4:122; 4:150-4:151.
Intel Corporation, "i860 TM Microprocessor Family Programmer's Reference Manual," 1992, Chapters 1, 3, 8 and 11.
Lee, R. B., "Accelerating Multimedia with Enhanced Microprocessors," IEEE Micro, Apr. 1995, pp. 22-32.
Intel Corporation, "Pentium Processor's User's Manual, vol. 3: Architecture and Programming Manual," 1993, Chapters 1, 3, 4, 6, 8, and 18.

Margulis, N., "i860 Microprocessor Architecture," McGraw Hill, Inc., 1990, Chapters 6, 7, 8, 10, and 11.
Intel Corporation, Intel i750, i860 TM, i960 Processors and Related Products, 1993, pp, 1-3.
Motorola, Inc., "Motorola MC88110 Second Generation RISC Microprocessor User's Manual," 1991, 600 pages.
Motorola, Inc., "Errata to MC88110 Second Generation RISC Microprocessor User's Manual," 1992, pp. 1-11.
Motorola, Inc., MC88110 Programmer's Reference Guide, 1992, pp. 1-4.
Shipnes, J., "Graphics Processing with the 88110 RISC Microprocessor," Motorola, Inc. IEEE, No. 0-8186-26455-0/92, 1992, pp. 169-174.
Advanced Micro Devices, Inc., "AMD-3D Technology Manual," Feb. 1998, pp. 1-58.
Hansen, C., "Architecture of a Broadband Medlaprocessor," Proceeedings of Compcon, IEEE, 1996, pp. 334-340.
Levinthal., et al, "Chap—A SIMD Graphics Processor," Computer Graphics Project, ACM, vol. 18, No. 3, Jul. 1984, pp. 77-81.
Levinthal, et al., "Parallel Computers for Graphics Applications," Proceedings: Second International Conference on Architectural Support for Programming Languages and Operating Systems, (ASPLOS II), IEEE, 1987, pp. 193-198.
Wang, et al., "A Processor Architecture for 3D Graphics Calculations," Computer Motion, Inc., Goleta, CA, 23 pgs.
Final Office Action received for U.S. Appl. No. 10/612,542, mailed on Mar. 26, 2007, 6 pages.
Non-Final Office Action received for U.S. Appl. No. 10/612,542, mailed on Aug. 16, 2006, 7 pages.
Notice of Allowance received for U.S. Appl. No. 10/612,542, mailed on Jun. 11, 2010, 4 pages.
Notice of Allowance received for U.S. Appl. No. 10/612,542, mailed on May 4, 2010, 4 pages.
Non-Final Office Action received for U.S. Appl. No. 12/907,843, mailed on Nov. 5, 2012, 8 pages.
Notice of Allowance received for U.S. Appl. No. 12/907,843, mailed on Apr. 12, 2013, 6 pages.
Final Office Action received for U.S. Appl. No. 13/477,544, mailed on Nov. 30, 2012, 8 pages.
Final Office Action received for U.S. Appl. No. 13/477,544, mailed on Oct. 10, 2013, 10 pages.
Non-Final Office Action received for U.S. Appl. No. 13/477,544, mailed on Aug. 22, 2012, 7 pages.
Non-Final Office Action received for U.S. Appl. No. 13/477,544, mailed on May 9, 2013, 6 pages.
Notice of Allowance received for U.S. Appl. No. 13/477,544, mailed on Mar. 10, 2014, 7 pages.
Final Office Action received for U.S. Appl. No. 13/602,546, mailed on Jan. 25, 2013, 8 pages.
Final Office Action received for U.S. Appl. No. 13/602,546, mailed on Oct. 7, 2013, 8 pages.
Non-Final Office Action received for U.S. Appl. No. 13/602,546, mailed on May 10, 2013, 5 pages.
Non-Final Office Action received for U.S. Appl. No. 13/602,546, mailed on Oct. 16, 2012, 8 pages.
Notice of Allowance received for U.S. Appl. No. 13/602,546, mailed on Mar. 31, 2014, 7 pages.
Non-Final Office Action received for U.S. Appl. No. 13/668,409, mailed on Feb. 20, 2015, 7 pages.
Non-Final Office Action received for U.S. Appl. No. 13/668,418, mailed on Feb. 23, 2015, 7 pages.
Non-Final Office Action received for U.S. Appl. No. 13/727,742, mailed on Feb. 20, 2015, 6 pages.
Non-Final Office Action received for U.S. Appl. No. 13/752,953, mailed on Feb. 13, 2015, 7 pages.
Non-Final Office Action received for U.S. Appl. No. 13/752,987, mailed on Feb. 20, 2015, 7 pages.
Non-Final Office Action received for U.S. Appl. No. 13/753,050, mailed on Feb. 10, 2015, 7 pages.
Non-Final Office Action received for U.S. Appl. No. 13/788,899, mailed on Feb. 20, 2015, 7 pages.
Final Office Action received for U.S. Appl. No. 13/843,521, mailed on Aug. 22, 2013, 8 pages.

(56) References Cited

OTHER PUBLICATIONS

Notice of Allowance received for U.S. Appl. No. 13/843,521, mailed on Mar. 31, 2014, 7 pages.

International Search Report and Written Opinion received for PCT Patent Application No. PCT/US03/33086, mailed Oct. 28, 2004, 7 pages.

* cited by examiner

| bits | value |
|---|---|
| 0 | 390 |
| 3 4 | 389 |
| 5 | 388 |
| 8 7 | 387 |
| 12 11 | 386 |
| 16 15 | 385 |
| 20 19 | 384 |
| 22 21 | 383 |
| 24 23 | 382 |
| 28 27 | 381 |
| 31 | |

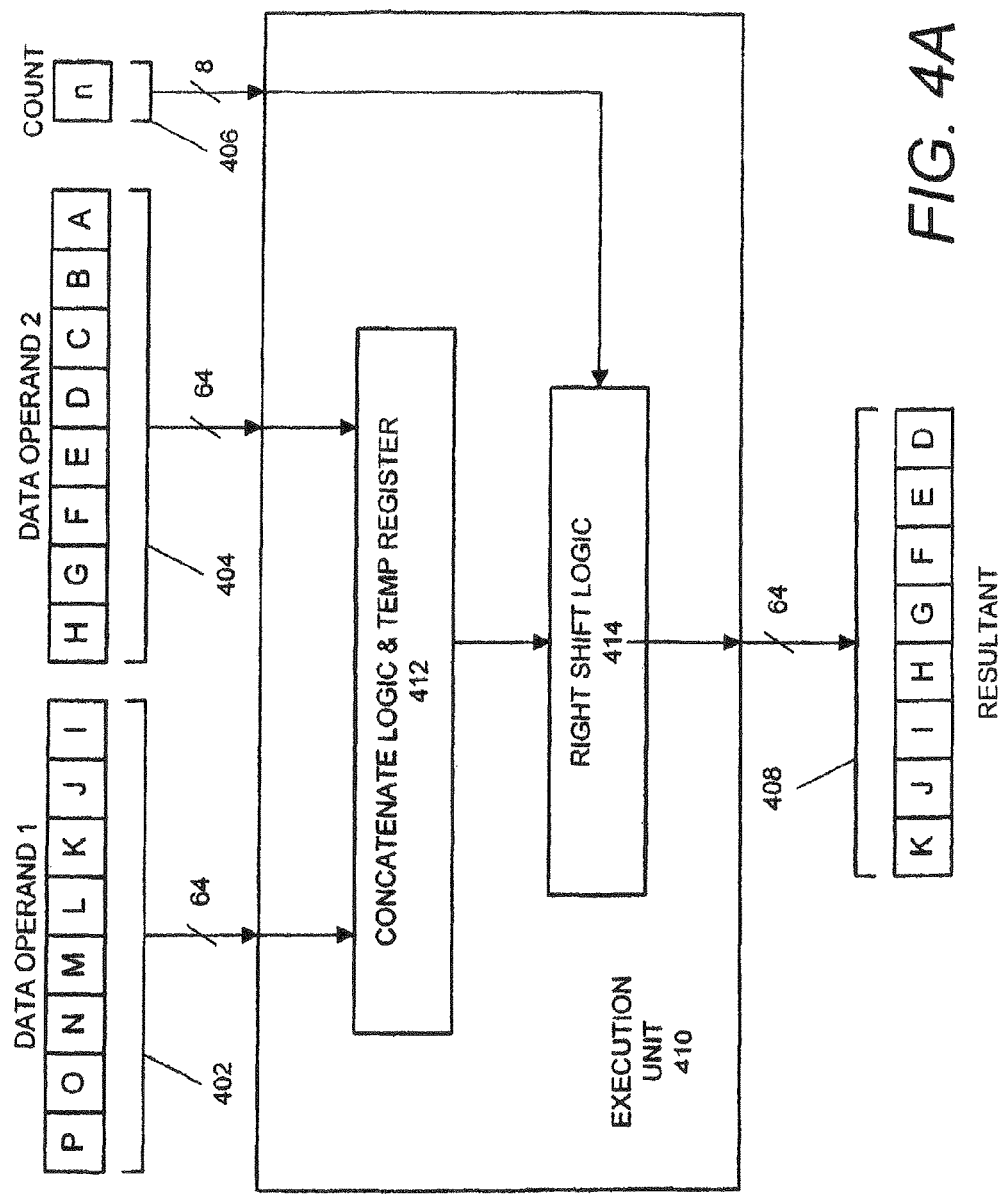

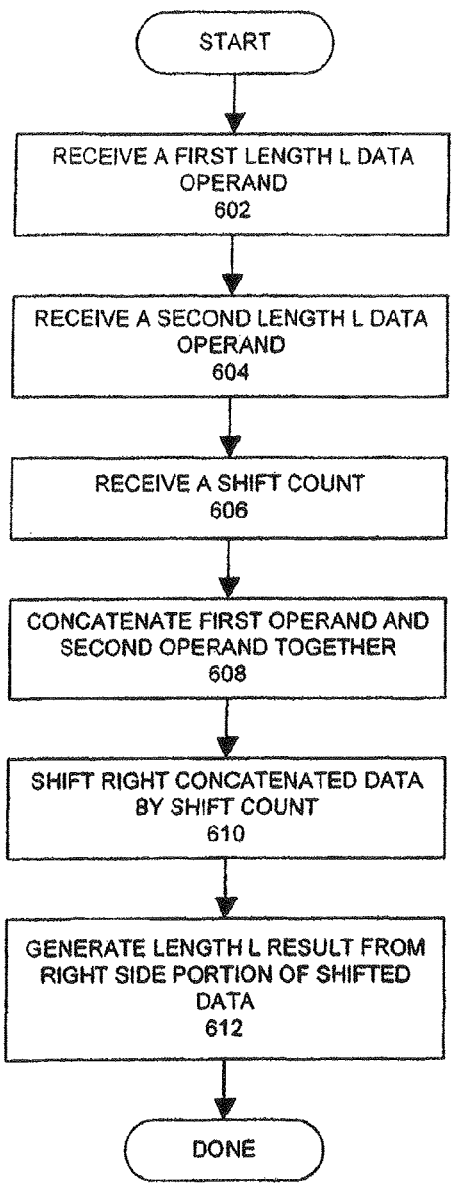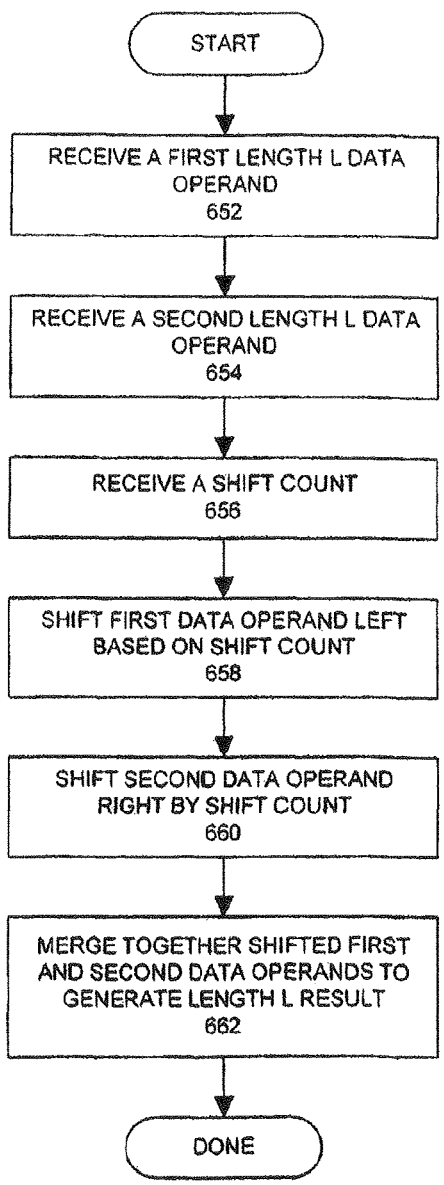
FIG. 6A
FIG. 6B

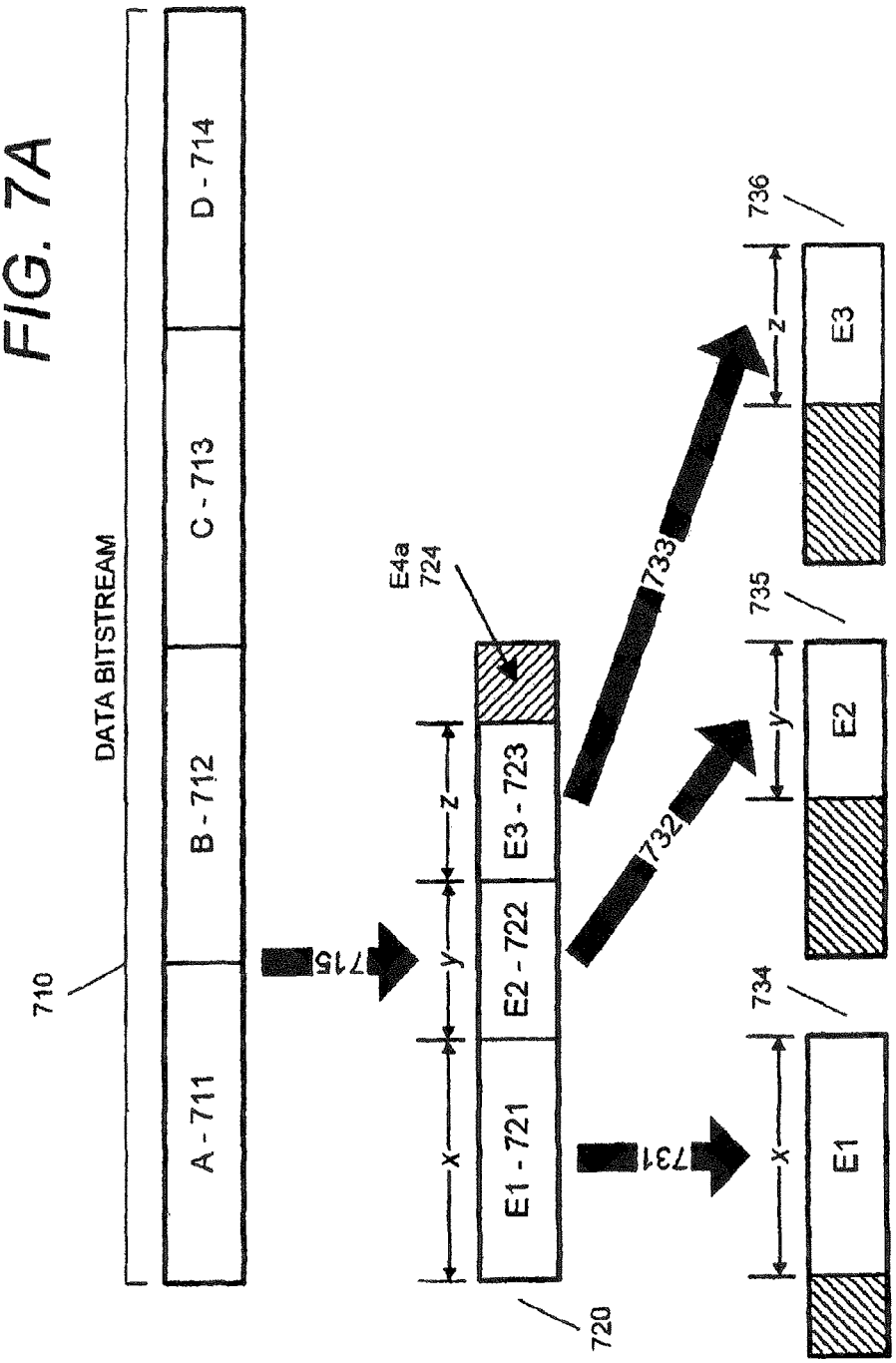

BITSTREAM BUFFER MANIPULATION WITH A SIMD MERGE INSTRUCTION

This application is a continuation of U.S. patent application Ser. No. 13/668,418, filed Nov. 5, 2012, which is a continuation of U.S. patent application Ser. No. 12/907,843, filed Oct. 19, 2010, which is a continuation of U.S. patent application Ser. No. 10/612,542, filed Jul. 1, 2003, now U.S. Pat. No. 7,818,356, which is a continuation-in-part of U.S. patent application Ser. No. 10/280,511, filed Oct. 25, 2002, now U.S. Pat. No. 7,272,622, which is a continuation-in-part of U.S. patent application Ser. No. 09/952,891, filed Oct. 29, 2001, now U.S. Pat. No. 7,085,795, the content of which is hereby incorporated by reference.

FIELD OF THE INVENTION

The present disclosure pertains to the field of processing apparatuses and associated software and software sequences that perform mathematical operations.

DESCRIPTION OF RELATED ART

As processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

The display of images, as well as playback of audio and video data, which is collectively referred to as content, have become increasingly popular applications for current computing devices. Filtering and convolution operations are some of the most common operations performed on content data, such as image audio and video data. Such operations are computationally intensive, but offer a high level of data parallelism that can be exploited through an efficient implementation using various data storage devices, for example, single instruction multiple data (SIMD) registers. A number of current architectures also require unnecessary data type changes which minimizes instruction throughput and significantly increases the number of clock cycles required to order data for arithmetic operations.

In communicating various types of data, especially for audio/video, compression and encoding is heavily used to reduce the enormous amount of data to something more manageable. If the code is comprised of fixed length pieces, an algorithm for decoding and handling the code can be optimized as the code pieces are predictable. However, with variable length codes, the situation is more complex. The code for each symbol has to be properly recognized and decoded. Additional complexities are also introduced with variable length codes due to the bit granularity of symbols and the large possibility that these symbols do not align with a more manageable byte boundary.

BRIEF DESCRIPTION OF THE DRAWINGS

The present invention is illustrated by way of example and not limitation in the Figures of the accompanying drawings, in which like references indicate similar elements.

FIG. 3E illustrates yet another alternative operation encoding format;

FIG. 4A is a block diagram of one embodiment of logic to perform a SIMD parallel shift merge operation on data operands in accordance with the present invention;

FIG. 6A is a flowchart illustrating one embodiment of a method to shift and merge data operands;

FIG. 6B is a flowchart illustrating another embodiment of a method to shift right and merge data;

FIG. 7A illustrates an operation for a bitstream buffer manipulation with a SIMD merge instruction in accordance with one embodiment of the present invention;

DETAILED DESCRIPTION

Figure 1A:
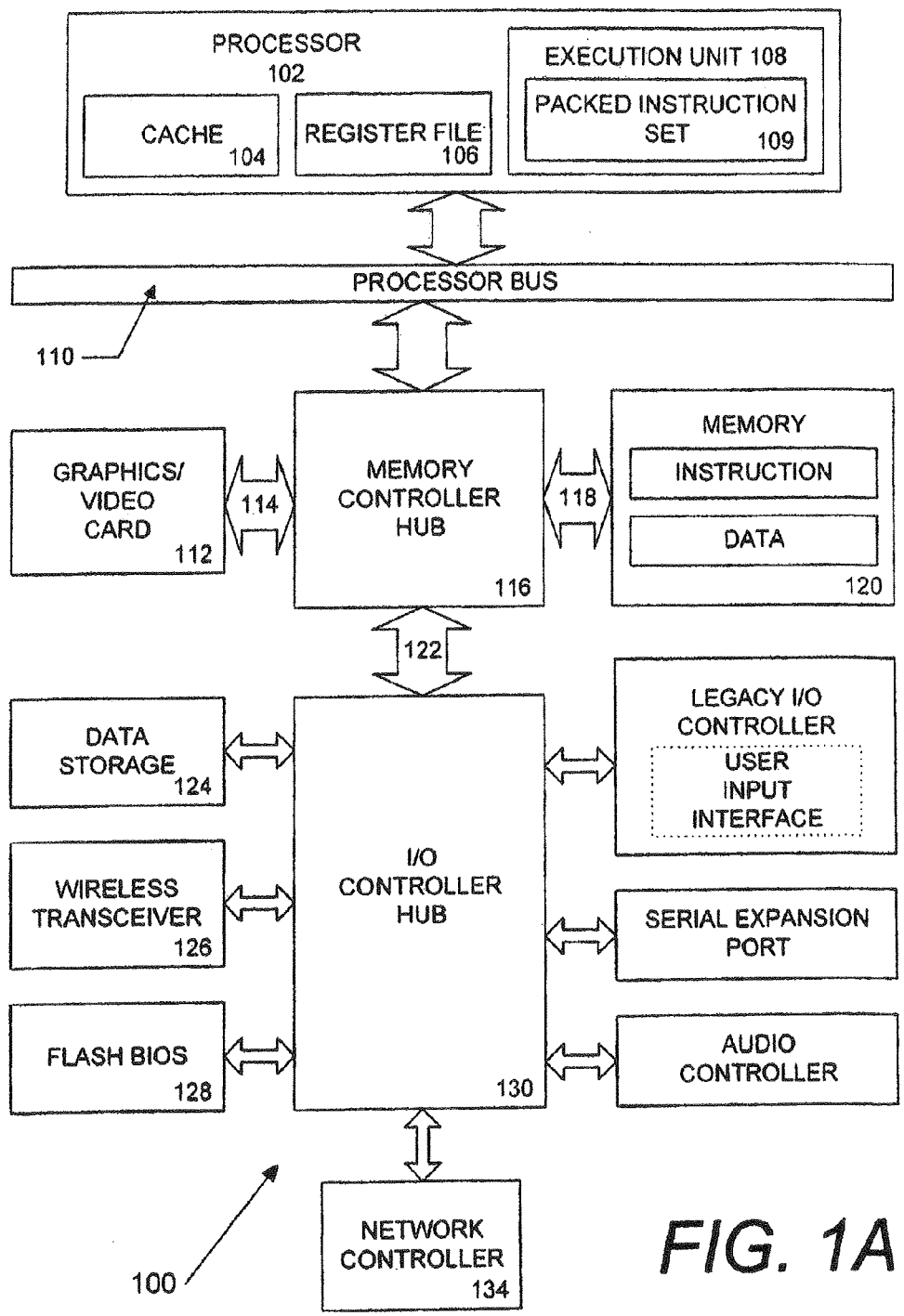
FIG. 1A is a block diagram of a computer system formed with a processor that includes execution units to execute a SIMD instruction for a parallel shift merge operation in accordance with one embodiment of the present invention.

The following description describes embodiments of a method for bitstream buffer manipulation with a SIMD merge instruction. In the following description, numerous specific details such as processor types, micro-architectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. Moreover, the present invention is not limited to processors or machines that perform 256 bit, 128 bit, 64 bit, 32 bit, or 16 bit data operations and can be applied to any processor and machine in which manipulation of packed data is needed.

In the following description, for purposes of explanation, numerous specific details are set forth in order to provide a thorough understanding of the present invention. One of ordinary skill in the art, however, will appreciate that these specific details are not necessary in order to practice the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

Although the below examples describe instruction handling and distribution in the context of execution units and logic circuits, other embodiments of the present invention can be accomplished by way of software. In one embodiment, the methods of the present invention are embodied in machine-executable instructions. The instructions can be used to cause a general-purpose or special-purpose processor that is programmed with the instructions to perform the steps of the present invention. The present invention may be provided as a computer program product or software which may include a machine or computer-readable medium having stored thereon instructions which may be used to program a computer (or other electronic devices) to perform a process according to the present invention. Alternatively, the steps of the present invention might be performed by specific hardware components that contain hardwired logic for performing the steps, or by any combination of programmed computer components and custom hardware components. Such software can be stored within a memory in the system. Similarly, the code can be distributed via a network or by way of other computer readable media.

Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like. Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Applications of coding and decoding operations are found in a wider array of image and video processing tasks and communications. One example of coding/decoding algorithms is used in processing of Motion Picture Expert Group (MPEG) video. Variable length encoding (VLC) and decoding (VLD) are used in various compression techniques and standards such as JPEG and MPEG. In variable length codes, the different symbols require a different numbers of bits. One operation in variable length decoding is to extract bits out of the bitstream before decoding the symbols. In order to extract a variable number of bits from the bitstream for a variable length symbol, the beginning of symbols have to be addressed by bits instead of bytes. However, addressing memory on a bit-wise level is difficult, data from the bitstream is sent to a temporary register first. The bits are then shifted around and manipulated to emulate bit addressability of the bitstream.

Unfortunately, current methods and instructions target the general needs of variable length coding/decoding and are not comprehensive. In fact, many architectures do not support a means for efficient extraction of varying length data symbols. In addition, data ordering within data storage devices such as SIMD registers, as well as a capability of merging values in a register and for partial data transfers between registers, are generally not supported. As a result, current architectures require unnecessary data type changes which increases the number of clock cycles required to order data for arithmetic operations. A SIMD shift merge instruction can be useful in audio and video applications where large amounts of packed data are processed. For example, a single shift merge instruction of one embodiment is capable of replacing multiple instructions that would be needed to perform an equivalent data manipulation. By reducing the number of instructions needed, throughput can be increased and processing resources such as registers and execution units freed up.

Presently, a number of instructions are needed in order to perform the requisite data manipulation for extracting symbols. This can be especially tedious in cases where the symbols are of variable length. The complexity is further increased where the variable lengths are at a bit granularity versus a more manageable byte granularity. The use of a SIMD shift merge type of instruction in a VLD algorithm to extract symbols can help reduce the instruction count and code complexity. For instance, one decoding algorithm to generate the same results without a SIMD shift merge instruction uses more instructions that take up additional processing resources and pipeline slots to perform the functionality and work of a single shift merge instruction. As a result, VLD code that does not use a shift merge type of instruction can often be lengthier in terms of code size and slower in terms of execution. Furthermore, memory loads and data dependencies that are present in decoding loops of the VLD algorithms can also gate instruction processing as execution resources are stalled until the needed data is available. The use of a shift merge instruction can assist in freeing up resources not only by reducing the instruction count, but by simplifying memory loads from a data bitstream.

Embodiments of the present invention provide a way to implement a bitstream buffer manipulation algorithm that makes use of SIMD instructions and related hardware. For one embodiment, the following algorithm illustrates how to extract n-bits for VLD. Data from a bitstream is directed into a temporary register. The correct number of bits are read out from the register for each symbol extracted. In one implementation, the symbol extraction involves copying the n-bits for the symbol to a general purpose register for further use. Although the value n is used here generally, each symbol being extracted can have a different number of bits. Thus n can vary from symbol to symbol. For one embodiment, the algorithm and/or logic scans the symbol properties to determine the proper value for that current symbol. This extraction can continue until less than all of the n-bits needed for the next symbol are available in the register. So when the temporary register has less than n-bits, then read m-bits from the bitstream. The value of m is a multiple of eight in this embodiment and a number much larger than n. The newly read m-bits are merged into the temporary register with the bits of interest in the register that are still being processed. Embodiments of the present invention use a shift merge instruction in the VLD algorithm shift and merge data during management of the bitstream buffers. The n-bits for the next symbol are then from the temporary register using a bit-wise shift.

FIG. 1A is a block diagram of an exemplary computer system formed with a processor that includes execution units to execute an instruction for a shift merge operation in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs merge operations on operands. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1A is a block diagram of a computer system 100 formed with a processor 102 that includes one or more execution units 108 to perform an algorithm to manipulate a bitstream buffer with a SIMD shift merge instruction in accordance with the present invention. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions.

In one embodiment, the processor 102 includes a Level 1 (L1) internal cache memory 104. Depending on the architecture, the processor 102 can have a single internal cache or multiple levels of internal cache. Alternatively, in another embodiment, cache memory can reside external to the processor 102. Other embodiments can also include a combination of both internal and external caches depending on the implementation. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a packed instruction set 109. In one embodiment, the packed instruction set 109 includes a packed parallel shift merge instruction for joining together blocks of data. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time. Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute a shift merge instruction can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
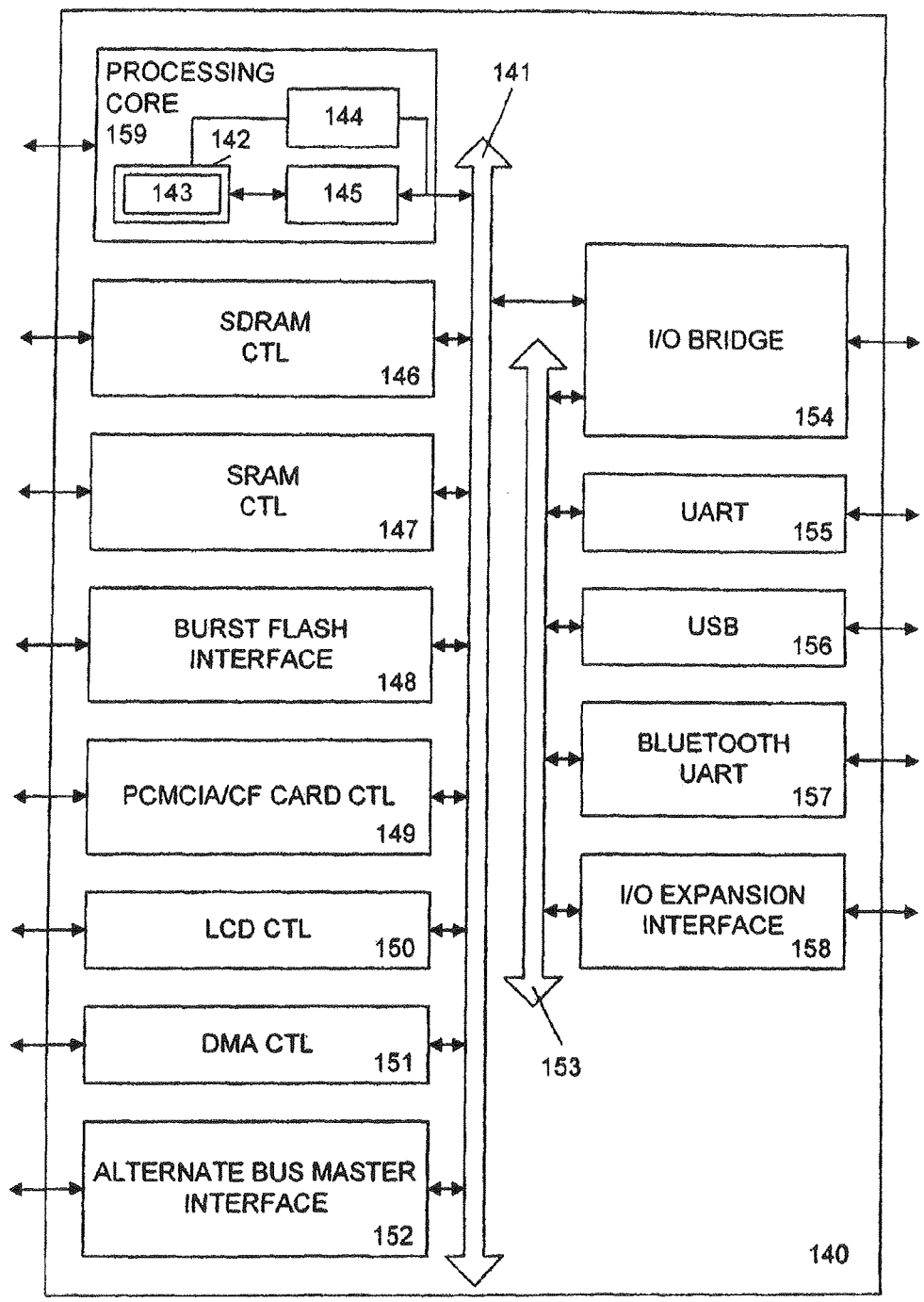
FIG. 1B is a block diagram of another exemplary computer system in accordance with an alternative embodiment of the present invention.

FIG. 1B illustrates an alternative embodiment of a data processing system 140 which implements the principles of the present invention. One embodiment of data processing system 140 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 140 comprises a processing core 159 capable of performing SIMD operations including a shift merge. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize instructions in packed instruction set 143 for performing operations on packed data formats. Packed instruction set 143 includes instructions for supporting data merge operations, and may also include other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a shift merge operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
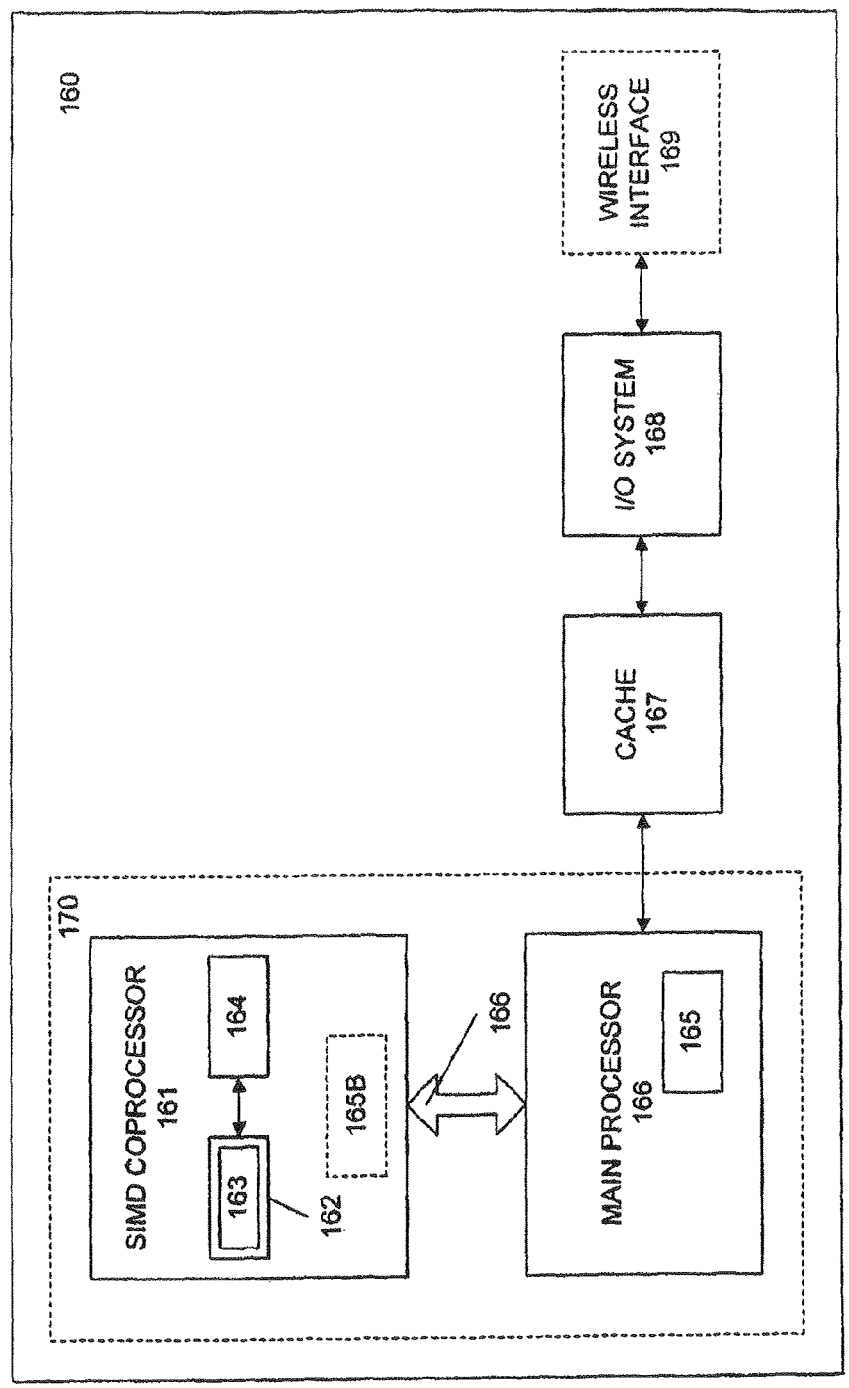
FIG. 1C is a block diagram of yet another exemplary computer system in accordance with another alternative embodiment of the present invention.

FIG. 1C illustrates yet alternative embodiments of a data processing system capable of performing SIMD shift merge operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing SIMD operations including data merges. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including SIMD shift merge instructions for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including SIMD merge instructions.

Figure 2:
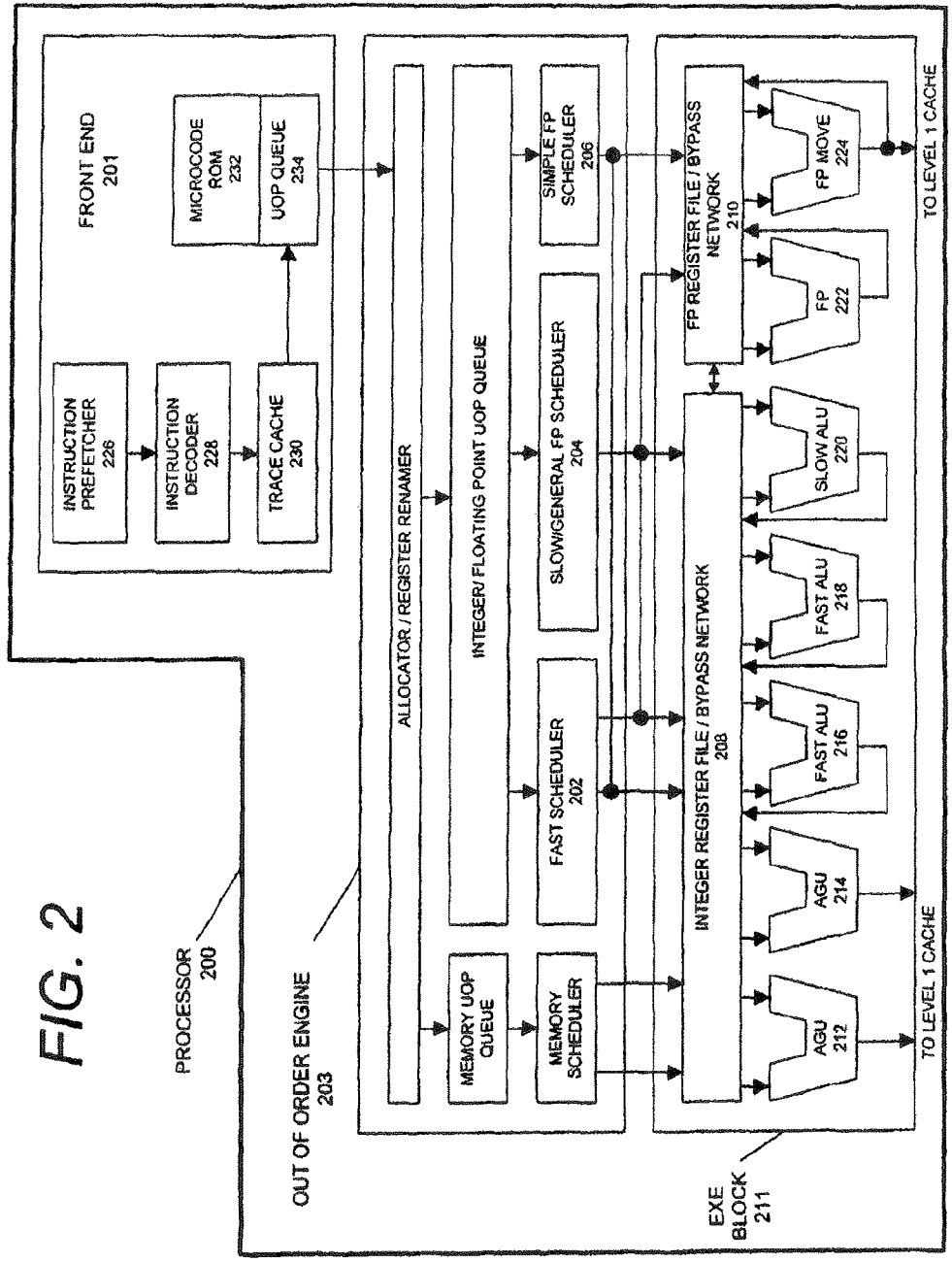
FIG. 2 is a block diagram of the micro-architecture for a processor of one embodiment that includes logic circuits to perform shift merge operations in accordance with the present invention.

FIG. 2 is a block diagram of the micro-architecture for a processor 200 of one embodiment that includes logic circuits to perform a shift merge operation in accordance with the present invention. The shift right merge operation may also be referred to as a register merge operation and register merge instruction. For one embodiment of the shift merge instruction, the instruction can take data from the two memory blocks, shift one or more data elements out of one block, and append/merge the same number of shifted data elements from the other block to the first block to generate a resultant merged data block. The shift merge instruction can also be referred to as PSRMRG or packed shift merge or parallel shift merge. In this embodiment, the shift merge instruction can also be implemented to operate on data elements having sizes of byte, word, doubleword, quadword, etc. The in-order front end 201 is the part of the processor 200 that fetches the macro-instructions to be executed and prepares them to be used later in the processor pipeline. The front end 201 of this embodiment includes several units. The instruction prefetcher 226 fetches macro-instructions from memory and feeds them to an instruction decoder 228 which in turn decodes them into primitives called micro-instructions or micro-operations (also called micro op or uops) that the machine knows how to execute. The trace cache 230 takes decoded uops and assembles them into program ordered sequences or traces in the uop queue 234 for execution. When the trace cache 230 encounters a complex macro-instruction, microcode ROM 232 provides uops needed to complete the operation.

Many macro-instructions are converted into a single micro-op, and others need several micro-ops to complete the full operation. In this embodiment, if more than four micro-ops are needed to complete a macro-instruction, the decoder 228 accesses the microcode ROM 232 to do the macro-instruction. For one embodiment, a shift merge instruction can be decoded into a small number of micro ops for processing at the instruction decoder 228. In another embodiment, an instruction for a packed shift merge algorithm can be stored within the microcode ROM 232 should a number of micro-ops be needed to accomplish the operation. The trace cache 230 refers to an entry point programmable logic array (PLA) to determine a correct micro-instruction pointer for reading micro-code sequences for merge algorithms in the micro-code ROM 232. After the microcode ROM 232 finishes sequencing micro-ops for the current macro-instruction, the front end 201 of the machine resumes fetching micro-ops from the trace cache 230.

Some SIMD and other multimedia types of instructions are considered complex instructions. Most floating point related instructions are also complex instructions. As such, when the instruction decoder 228 encounters a complex macro-instruction, the microcode ROM 232 is accessed at the appropriate location to retrieve the microcode sequence for that macro-instruction. The various micro-ops needed for performing that macro-instruction are communicated to the out-of-order execution engine 203 for execution at the appropriate integer and floating point execution units.

The out-of-order execution engine 203 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of this embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of this embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of this embodiment is comprised of a number of execution units: address generation unit (AGU) 212, AGU 214, fast ALU 216, fast ALU 218, slow ALU 220, floating point ALU 222, floating point move unit 224. For this embodiment, the floating point execution blocks 222, 224, execute floating point, MMX, SIMD, and SSE operations. The floating point ALU 222 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider. On the other hand, non-floating point numbers and integer type are handled with integer hardware resources. The simple, very frequent ALU operations go to the high-speed ALU execution units 216, 218. The fast ALUs 216, 218, of this embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For this embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In this embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed. The independent ones are allowed to complete.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operated with packed data elements that accompany SIMD and SSE instructions. Similarly, 128 bits wide XMM registers relating to SSE2 technology can also be used to hold such packed data operands. In this embodiment, in storing packed data and integer data, the registers do not need to differentiate between the two data types.

Figure 3A:
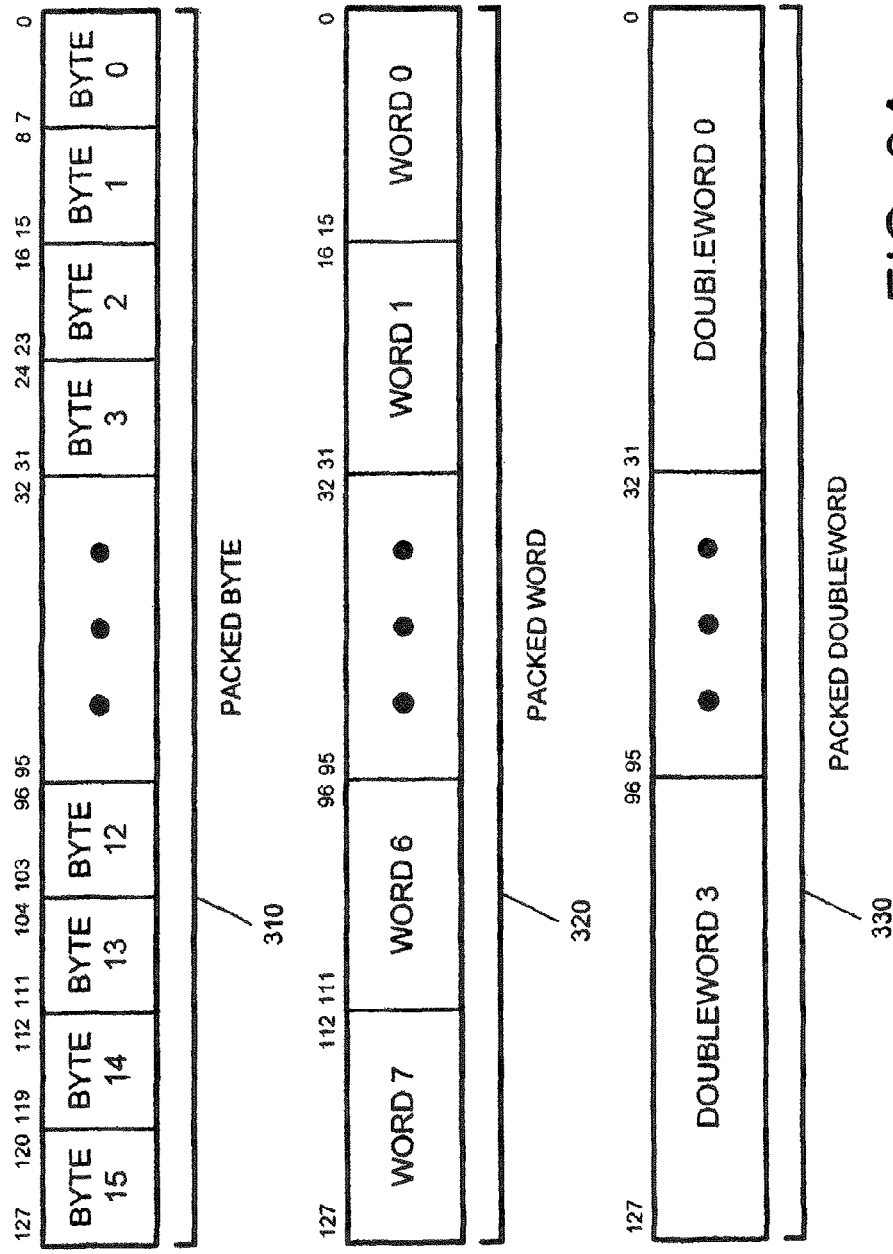
FIG. 3A illustrates various packed data type representations in multimedia registers according to one embodiment of the present invention.

FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as eight bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSE2 technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword element contains thirty two bits of information. A packed quadword is 128 bits long and contains two packed quadword data elements.

Figure 3B:
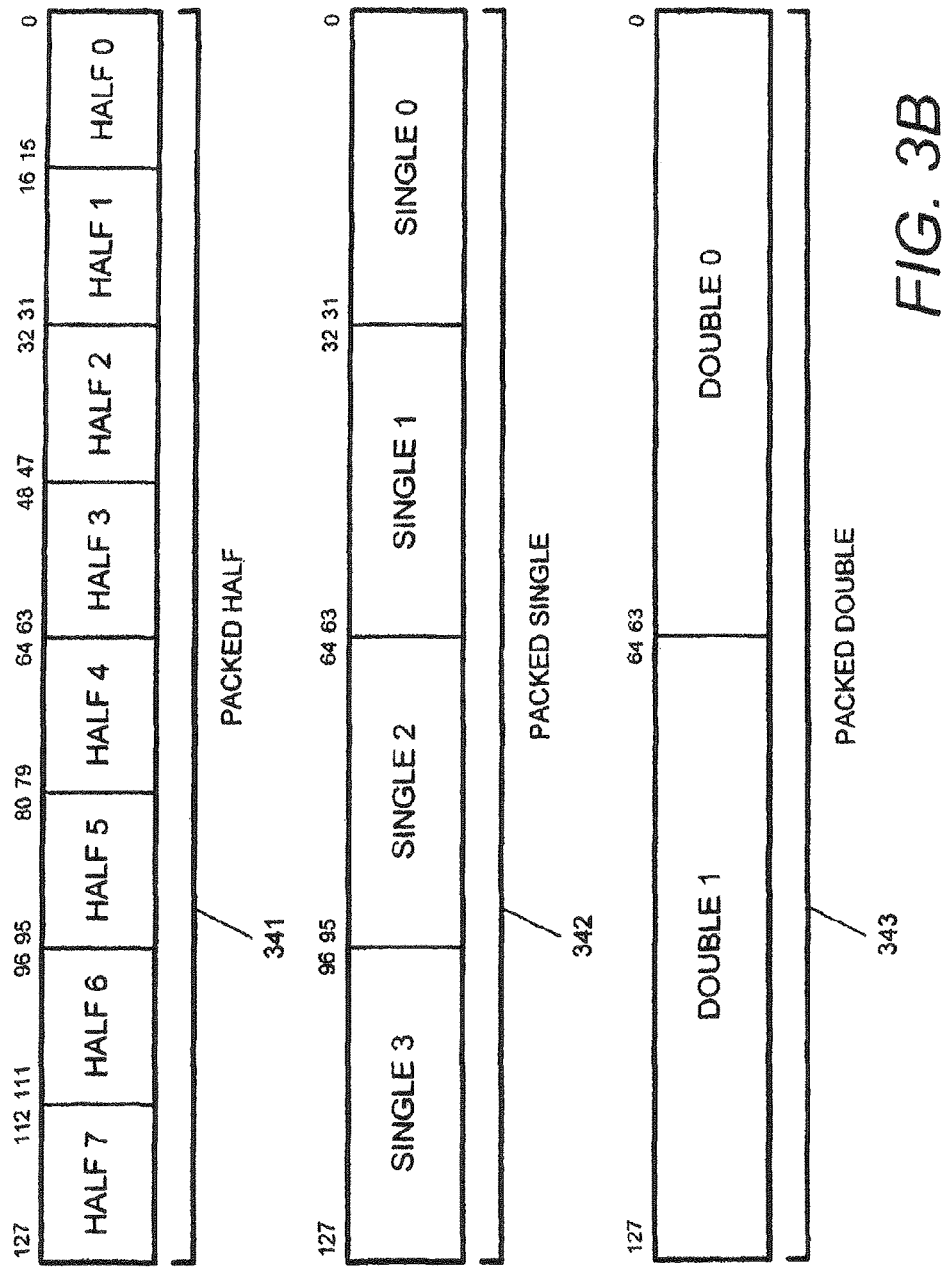
FIG. 3B illustrates packed data-types in accordance with an alternative embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

Figure 3C:
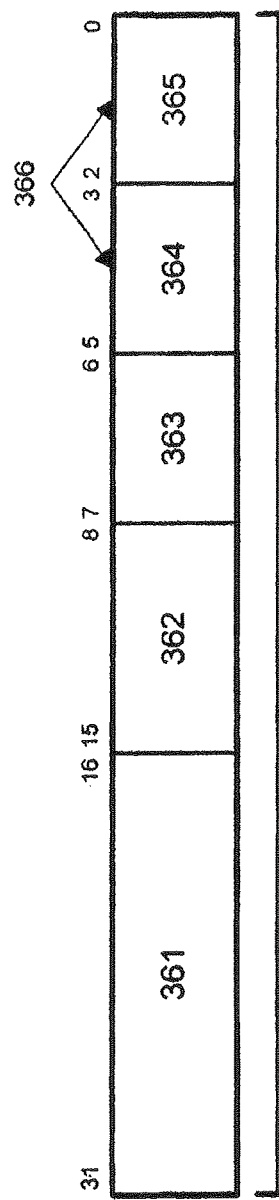
FIG. 3C illustrates one embodiment of an operation encoding (opcode) format.

FIG. 3C is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. The type of shift merge operation, may be encoded by one or more of fields 361 and 362. Up to two operand locations per instruction may be identified, including up to two source operand identifiers 364 and 365. For one embodiment of the shift merge instruction, destination operand identifier 366 is the same as source operand identifier 364. For an alternative embodiment, destination operand identifier 366 is the same as source operand identifier 365. Therefore, for embodiments of a shift merge operation, one of the source operands identified by source operand identifiers 364 and 365 is overwritten by the results of the shift merge operations. For one embodiment of the shift merge instruction, operand identifiers 364 and 365 may be used to identify 64-bit source and destination operands.

Figure 3D:
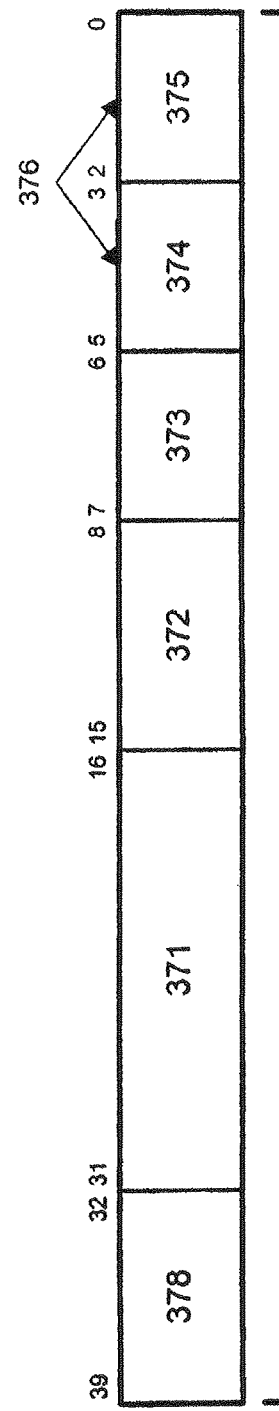
FIG. 3D illustrates an alternative operation encoding (opcode) format.

FIG. 3D is a depiction of another alternative operation encoding (opcode) format 370, having forty or more bits. Opcode format 370 corresponds with opcode format 360 and comprises an optional prefix byte 378. The type of shift right merge operation, may be encoded by one or more of fields 378, 371, and 372. Up to two operand locations per instruction may be identified by source operand identifiers 374 and 375 and by prefix byte 378. For one embodiment of the merge instruction, prefix byte 378 may be used to identify 128-bit source and destination operands. For one embodiment of the shift merge instruction, destination operand identifier 376 is the same as source operand identifier 374. For an alternative embodiment, destination operand identifier 376 is the same as source operand identifier 375. Therefore, for embodiments of the shift merge operations, one of the source operands identified by source operand identifiers 374 and 375 is overwritten by the results of the shift merge operations. Opcode formats 360 and 370 allow register to register, memory to register, register by memory, register by register, register by immediate, register to memory addressing specified in part by MOD fields 363 and 373 and by optional scale-index-base and displacement bytes.

Turning next to FIG. 3E, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments of shift merge operations, may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, the merge operation is performed on fixed-point or integer data elements. In some embodiments, a merge instruction may be executed conditionally, using condition field 381. For some merge instructions source data sizes may be encoded by field 383. In some embodiments of a shift merge instruction, Zero (Z), negative (N), carry (C), and overflow (V) detection can be done on SIMD fields. For some instructions, the type of saturation may be encoded by field 384.

In the examples of the following figures, a number of data operands are described. For simplicity, the data segments are labeled from letter A onwards alphabetically, wherein A is located at the lowest address and Z would be located at the highest address. Thus, A may be at address 0, B at address 1, C at address 3, and so on. Although the data sequences in some of the examples appear with the letters arranged in reverse alphabetic order, the addressing would still start with A at 0, B at 1, etc. Conceptually, a shift right operation, as in the shift right merge for one embodiment, entails right shifting the lower address data segments out if the sequence is D, C, B, A. Thus, a right shift simply shifts the data elements of a data block to the right past a stationary line. Furthermore, a shift right merge operation can conceptually right shift the rightmost data segments from one operand into the left side of another data operand as if the two operands were on a continuum.

FIG. 4A is a block diagram of one embodiment of logic to perform a SIMD parallel shift merge operation on data operands in accordance with the present invention. The PSRMRG instruction for a shift right merge (also, a register shift) operation of this embodiment begins with three pieces of information: a first data operand 402, a second data operand 404, and a shift count 406. In one embodiment, the PSRMRG shift merge instruction is decoded into one micro-operation. In an alternate embodiment, the instruction may be decoded into a various number of micro-ops to perform the shift merge operation on the data operands. For this example, the data operands 402, 404, are 64 bit wide pieces of data stored in a register/memory and the shift count 406 is an 8 bit wide immediate value. Depending on the particular implementation, the data operands and shift count can be other widths such as 128/256 bits and 16 bits, respectively. The first operand 402 in this example is comprised of eight data segments: P, O, N, M, L, K, J, and I. The second operand 404 is also comprised of eight data segments: H, G, F, E, D, C, B, and A. The data segments here are of equal length and each comprise of a single byte (8 bits) of data. However, another embodiment of the present invention operates with longer 128 bit operands wherein the data segments are comprised of a single byte (8 bits) each and the 128 bit wide operand would have sixteen byte wide data segments. Similarly, if each data segment was a double word (32 bits) or a quad word (64 bits), the 128 bit operand would have four double word wide or two quad word wide data segments, respectively. Thus embodiments of the present invention are not restricted to particular length data operands, data segments, or shift counts, and can be sized appropriately for each implementation.

The operands 402, 404 can reside either in a register or a memory location or a register file or a mix. The data operands 402, 404, and the count 406 are sent to an execution unit 410 in the processor along with a shift right merge instruction. By the time the shift right merge instruction reaches the execution unit 410, the instruction should have been decoded earlier in the processor pipeline. Thus the shift right merge instruction can be in the form of a micro operation (uop) or some other decoded format. For this embodiment, the two data operands 402, 404, are received at concatenate logic and a temporary register. The concatenate logic merges/joins the data segments for the two operands and places the new block of data in a temporary register. Here, the new data block is comprised of sixteen data segments: P, O, N, M, L, K, J, I, H, G, F, E, D, C, B, A. As this example is working with 64 bits wide operands, the temporary register need to hold the combined data is 128 bits wide. For 128 bits wide data operands, a 256 bits wide temporary register is needed.

Right shift logic 414 in the execution unit 410 takes the contents of the temporary register and performs a logical shift right of the data block by n data segments as requested by the count 406. In this embodiment, the count 406 indicates the number of bytes to right shift. Depending on the particular implementation, the count 406 can also be used to indicated the number of bits, nibbles, words, double words, quad words, etc. to shift, depending on the granularity of the data segments. For this example, n is equal to 3, so the temporary register contents are shifted by three bytes. If each data segment was a word or double word wide, then the count can indicate the number of words or double words to shift, respectively. For this embodiment, 0's are shifted in from the left side of the temporary register to fill up the vacated spaces as the data in the register is shifted right. Thus if the shift count 406 is greater than the number of data segments in a data operand (eight in this case), one or more 0's can appear in the resultant 408. Furthermore, if the shift count 406 is equal to or exceeds the total number of data segments for both operands, the resultant will comprise of all 0's, as all the data segments will have been shifted away. The right shift logic 414 outputs the appropriate number of data segments from the temporary register as the resultant 408. In another embodiment, an output multiplexer or latch can be included after the right shift logic to output the resultant. For this example, the resultant is 64 bits wide and includes eight bytes. Due to the shift right merge operation on the two data operands 402, 404, the resultant is comprised of the following eight data segments: K, J, I, H, G, F, E, and D.

Figure 4B:
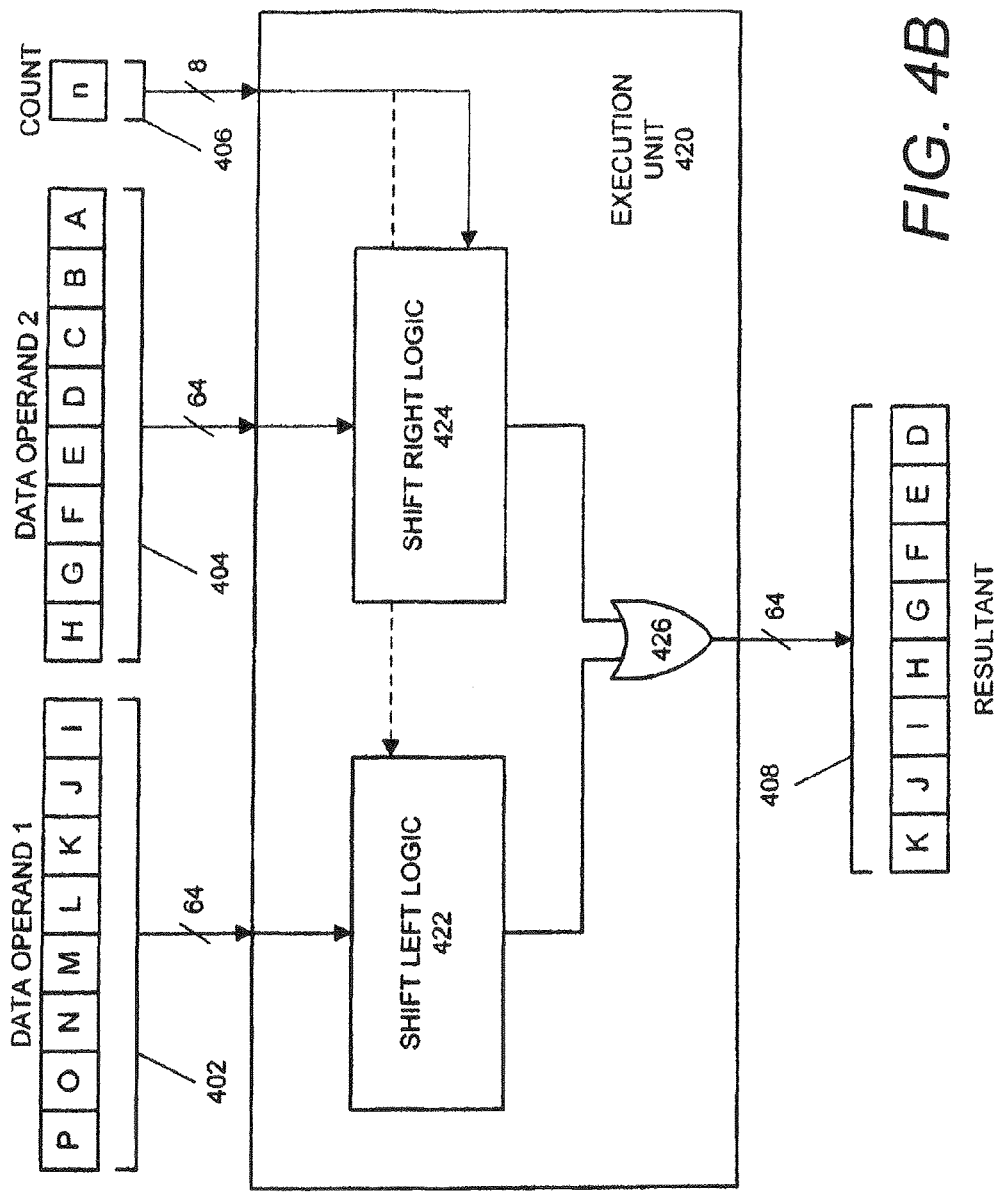
FIG. 4B is a block diagram of another embodiment of logic to perform a shift right merge operation.

FIG. 4B is a block diagram of another embodiment of logic to perform a shift right merge operation. Like the previous example of FIG. 4A, the shift right merge operation of this embodiment begins with three pieces of information: a first 64 bits wide data operand 402, a second 64 bits wide data operand 404, and a 8 bits wide shift count 406. The shift count 406 indicates how many places to shift the data segments. For this embodiment, the count 406 is stated in number of bytes. In an alternate embodiment, the count may indicate the number of bits, nibbles, words, double words, or quad words to shift the data. The first and second operands 402 in this example are each comprised of eight equal length, byte size data segments (H, G, F, E, D, C, B, A) and the second operand 404 is comprised of eight data segments (P, O, N, M, L, K, J, I). The count n is equal to 3. Another embodiment of the invention can operate with alternative length operands and data segments, such as 128/256/512 bits wide operands and bit/byte/word/double word/quad word sized data segments and 8/16/32 bits wide shift counts. Thus embodiments of the present invention are not restricted to particular length data operands, data segments, or shift counts, and can be sized appropriately for each implementation.

The data operands 402, 404, and the count 406 are sent to an execution unit 420 in the processor along with a shift right merge instruction. For this embodiment, the first data operand 402 and the second data operand 404 are received at shift left logic 422 and shift right logic 424, respectively. The count 406 is also sent to the shift logic 422, 424. The shift left logic 422 shifts data segments for the first operand 402 left by the "number of data segments in the first operand—n" number of segments. As the data segments are shifted left, 0's are shifted in from the right side to fill up the vacated spaces. In this case, there are eight data segments, so the first operand 402 is shifted left by eight minus three, or five, places. The first operand 402 is shifted by this different value to achieve the correct data alignment for merging at the logical OR gate 426. After the left shift here, the first data operand becomes: K, J, I, 0, 0, 0, 0, 0. If the count 406 is greater than the number of number of data segments in the operand, the shift left calculation can yield a negative number, indicating a negative left shift. A logical left shift with a negative count is interpreted as a shift in the negative direction and is essentially a logical right shift. A negative left shift will bring in 0's from the left side of the first operand 402.

Similarly, the shift right logic 424 shifts data segments for the second operand right by n number of segments. As the data segments are shifted right, 0's are shifted in from the left side to fill up the vacated spaces. The second data operand becomes: 0, 0, 0, H, G, F, E, D. The shifted operands are outputted from the shift left/right logic 422, 424, and merged together at the logical OR gate 426. The OR gate performs a logical or-ing of the data segments and provides a 64 bits wide resultant 408 of this embodiment. The or-ing together of "K, J, I, 0, 0, 0, 0, 0" with "0, 0, 0, H, G, F, E, D" generates a resultant 408 comprising eight bytes: K, J, I, H, G, F, E, D. This result is the same as that for the first embodiment of the present invention in FIG. 4A. Note that for a count n 406 greater than the number of data elements in an operand, the appropriate number of 0's can appear in the resultant starting on the left side. Furthermore, if the count 406 is greater than or equal to the total number of data elements in both operands, the resultant will comprise of all 0's.

Figure 5A:
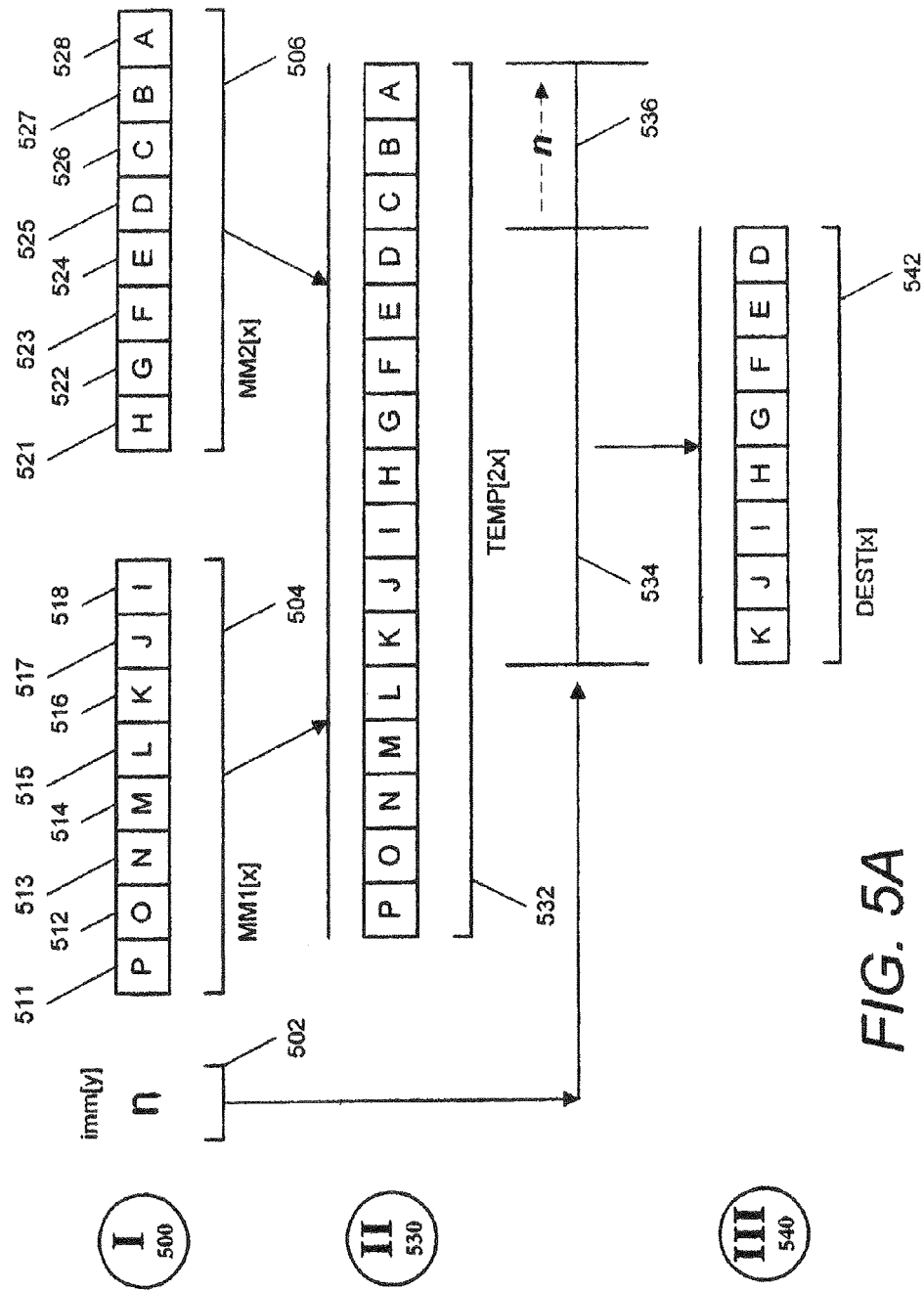
FIG. 5A illustrates the operation of a parallel shift merge instruction in accordance with a first embodiment of the present invention.

FIG. 5A illustrates the operation of a parallel shift merge instruction in accordance with a first embodiment of the present invention. For these discussions, MM1 504, MM2 506, TEMP 532, and DEST 542, are generally referred to as operands or data blocks, but are not restricted as such and also include registers, register files, and memory locations. In one embodiment MM1 504 and MM2 506 are 64 bits wide MMX registers (also referred to as 'mm' in some instances). At the state 1500, a shift count imm[y] 502, a first operand MM1[x] 504, and a second operand MM2[x] 506 are sent with the parallel shift right merge instruction. The count 502 is an immediate value of y bits width. The first 504 and second 506 operands are data blocks including x data segments and having total widths of 8x bits each if each data segment is a byte (8 bits). The first 504 and second 506 operands are each packed with a number of smaller data segments. For this example, the first data operand MM1 504 is comprised of eight equal length data segments: P 511, O 512, N 513, M 514, L 515, K 516, J 517, I518. Similarly, the second data operand MM2 506 is comprised of eight equal length data segments: H 521, G 522, F 523, E 524, D 1225, C 526, B 527, A 528. Thus each of these data segments are 'x*8' bits wide. So if x is 8, each operand is 8 bytes or 64 bits wide. For other embodiments, a data element can be a nibble (4 bits), word (16 bits), double word (32 bits), quad word (64 bits), etc. In alternate embodiments, x can be 16, 32, 64, etc. data elements wide. The count y is equal to 8 for this embodiment and the immediate can be represented as a byte. For alternate embodiments, y can be 4, 16, 32, etc. bits wide. Furthermore, the count 502 is not limited to an immediate value and can also be stored in a register or memory location.

The operands MM1 504 and MM2 506 are merged together at state II 530 to form a temporary data block TEMP[2x] 532 of 2x data elements (or bytes in this case) wide. The merged data 532 of this example is comprised of sixteen data segments arranged as: P, O, N, M, L, K, J, I, H, G, F, E, D, C, B, and A. An eight byte wide window 534 frames eight data segments of the temporary data block 532, starting from the rightmost edge. Thus the right edge of the window 534 would line up with the right edge of the data block 532 such that the window 534 frames data segments: H, G, F, E, D, C, B, and A. The shift count n 502 indicates the desired amount to right shift the merged data. The count value can be implemented to state the shift amount in terms of bits, nibbles, bytes, words, double words, quad words, etc., or particular number of data segments. Based on the count value 502, the data block 532 is shifted right 536 by n data segments here. For this example, n is equal to 3 and the data block 532 is slid three places to the right. Another way of looking at this is to shift the window 534 in the opposite direction. In other words, the window 534 can be conceptually viewed as shifting three places to the left from the right edge of the temporary data block 532. For one embodiment, if the shift count n is greater than the total number of data segments, 2x, present in the combined data block, the resultant would comprise of all '0's. Similarly, if the shift count n is greater than or equal to the number data segments, x, in an the first operand 504, the resultant would include one or more '1's starting from the left side of the resultant. At state III 540, the data segments (K, J, I, H, G, F, E, D) framed by the window 534 is outputted as a resultant to an x data elements wide destination DEST[x] 542.

Figure 5B:
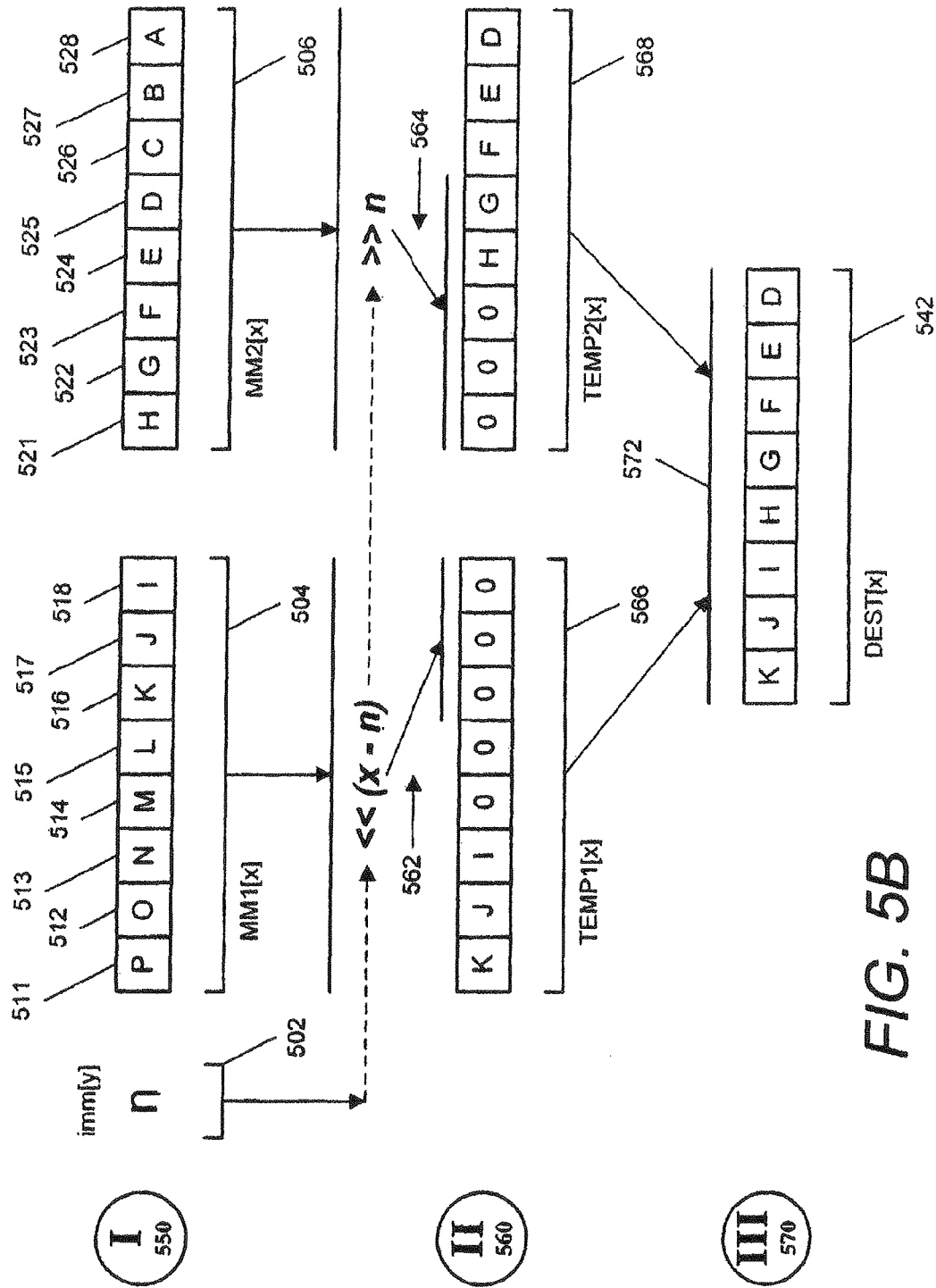
FIG. 5B illustrates the operation of a shift right merge instruction in accordance with a second embodiment.

FIG. 5B illustrates the operation of a shift right merge instruction in accordance with a second embodiment. The shift right merge instruction is accompanied at state 1550 by a count imm[y] of y bits, a first data operand MM1[x] of x data segments, and as second data operand MM2[x] of x data segments. As with the example of the FIG. 5A, y is equal to 8 and x is equal to 8, wherein MM1 and MM2 each being 64 bits or 8 bytes wide. The first 504 and second 506 of this embodiment are packed with a number of equally sized data segments, each a byte wide in this case, "P 511, O 512, N 513, M 514, L 515, K 516, J 517, I 518" and H 521, G 522, F 523, E 524, D 525, C 526, B 1227, A 528", respectively.

At state II 560, the shift count n 502 is used to shift the first 504 and second 506 operands. The count of this embodiment indicates the number of data segments to right shift the merged data. For this embodiment, the shifting occurs before the merging of the first 504 and second 506 operands. As a result, the first operand 504 is shifted differently. In this example, the first operand 504 is shifted left by x minus n data segments. The "x−n" calculation allows for proper data alignment at later data merging. Thus for a count n of 3, the first operand 504 is shifted to the left by five data segments or five bytes. There are 0's shifted in from the right side to fill the vacated spaces. But if shift count n 502 is greater than the number of number of data segments x available in first operand 504, the shift left calculation of "x−n" can yield a negative number, which in essence indicates a negative left shift. In one embodiment, a logical left shift with a negative count is interpreted as a left shift in the negative direction and is essentially a logical right shift. A negative left shift will bring in 0's from the left side of the first operand 504. Similarly, the second operand 506 is shifted right by the shift count of 3 and 0's are shifted in from the left side to fill the vacancies. The shifted results are held for the first 504 and second 506 operands are stored in x data segments wide registers TEMP1 566 and TEMP2 568, respectively. The shifted results from TEMP1 566 and TEMP2 568 are merged together 572 to generate the desired shift merged data at register DEST 542 at state III 570. If shift count n 502 is greater than x, the operand can contain one or more 0's in the resultant from the left side. Furthermore, if shift count n 502 is equal to 2x or greater, the resultant in DEST 542 will comprise of all 0's.

In the above examples, such as in FIGS. 5A and 5B, one or both MM1 and MM2 can be 64 bits data registers in a processor enabled with MMX/SSE technology or 128 bits data registers with SSE2 technology. Depending on the implementation, these registers can be 64/128/256 bits wide. Similarly, one or both of MM1 and MM2 can be memory locations other than a register. In the processor architecture of one embodiment, MM1 and MM2 are source operands to a shift right merge instruction (PSRMRG) as described above. The shift count IMM is also an immediate to such a PSRMRG instruction. For one embodiment, the destination for the resultant, DEST, is also a MMX or XMM data register. Furthermore, DEST may be the same register as one of the source operands. For instance, in one architecture, a PSRMRG instruction has a first source operand MM1 and a second source operand MM2. The predefined destination for the resultant can be the register for the first source operand, MM1 in this case.

FIG. 6A is a flowchart illustrating one embodiment of a method to shift and merge data operands. The length values of L is generally used here to represent the width of the operands and data blocks. Depending on the particular embodiment, L can be used to designate the width in terms of number of data segments, bits, bytes, words, etc. At block 602, a first length L data operand is received for use with the execution of a shift merge operation. A second length L data operand for the shift merge operation is also received at block 604. A shift count to indicated how many data segments or distance, in bits/nibbles/bytes/words/double words/quad words, is received at block 606. Execution logic at block 608 concatenates the first operand and the second operand together. For one embodiment, a temporary length 2L register holds the concatenated data block. In an alternated embodiment, the merged data is held in a memory location. At block 610, the concatenated data block is shifted right by the shift count. If the count is expressed as a data segment count, then the data block is shifted right by that many data segments and 0's are shifted in from the left along the most significant end of the data block to fill the vacancies. If the count is expressed in bits or bytes, for example, the data block is similarly right shifted by that distance. At block 612, a length L resultant is generated from the right hand side or least significant end of the shifted data block. For one embodiment, the length L amount of data segments are muxed from the shifted data block to a destination register or memory location.

FIG. 6B is a flowchart illustrating another embodiment of a method to shift right and merge data. A first length L data operand is received for processing with a shift right and merge operation at block 652. A second length L data operand is received at block 654. At block 656, a shift count to indicate the desired right shift distance. The first data operand is shifted left at block 658 based on a calculation with the shift count. The calculation of one embodiment comprises subtracting the shift count from L. For instance, if operand length L and shift count are in terms of data segments, then the first operand is shifted left by "L-shift count" segments, with 0's shifting in from the least significant end of the operand. Similarly, if L is expressed in bits and the count is in bytes, the first operand would be shifted left by "L-shift count*8" bits. The second data operand is shifted right at block 660 by the shift count and 0's shifted in from the most significant end of the second operand to fill vacancies. At block 662, the shifted first operand and the shifted second operand are merged together to generate a length L resultant. For one embodiment, the merging yields a result comprising the desired data segments from both the first and second operands.

One increasingly popular use for computers involves manipulation of extremely large video and audio files. Even though these video and audio are typically transferred via very high bandwidth networks or high capacity storage media, data compression is still necessary in order to handle the traffic. As a result, different compression algorithms are becoming important parts of the representation or coding scheme for many popular audio, image, and video formats. Video in accordance with one of the Motion Picture Expert Group (MPEG) standards is one application that uses compression.

For one embodiment, a predetermined amount of data is loaded from a bitstream into a temporary bitstream buffer. This implementation is enabled to track the number of remaining data bits in the temporary buffer and to check whether enough bits remain to extract another symbol. If an insufficient number of unprocessed bits remain, meaning not all the requisite bits for the present symbol being extracted have been loaded, the bitstream buffer is refilled with additional data bits from the bitstream. The algorithm of this embodiment employs a shift merge instruction to create a new block of data based on the remaining bits in the temporary buffer and on bitstream data. The pointer to the current bitstream position is also adjusted to account for the data load. Similarly, the bit count for the temporary buffer is also updated to reflect the total number of data bits now present. During the symbol extraction for one embodiment, an individual symbol is gradually extracted from the temporary bitstream buffer and unnecessary data bits on the leading edge of the data block are shifted out. In this embodiment, the associated bits for each decoding symbol are moved from the temporary buffer to a general purpose register. One embodiment of the present invention can be included with MPEG-2 VLD code.

Figure 7B:
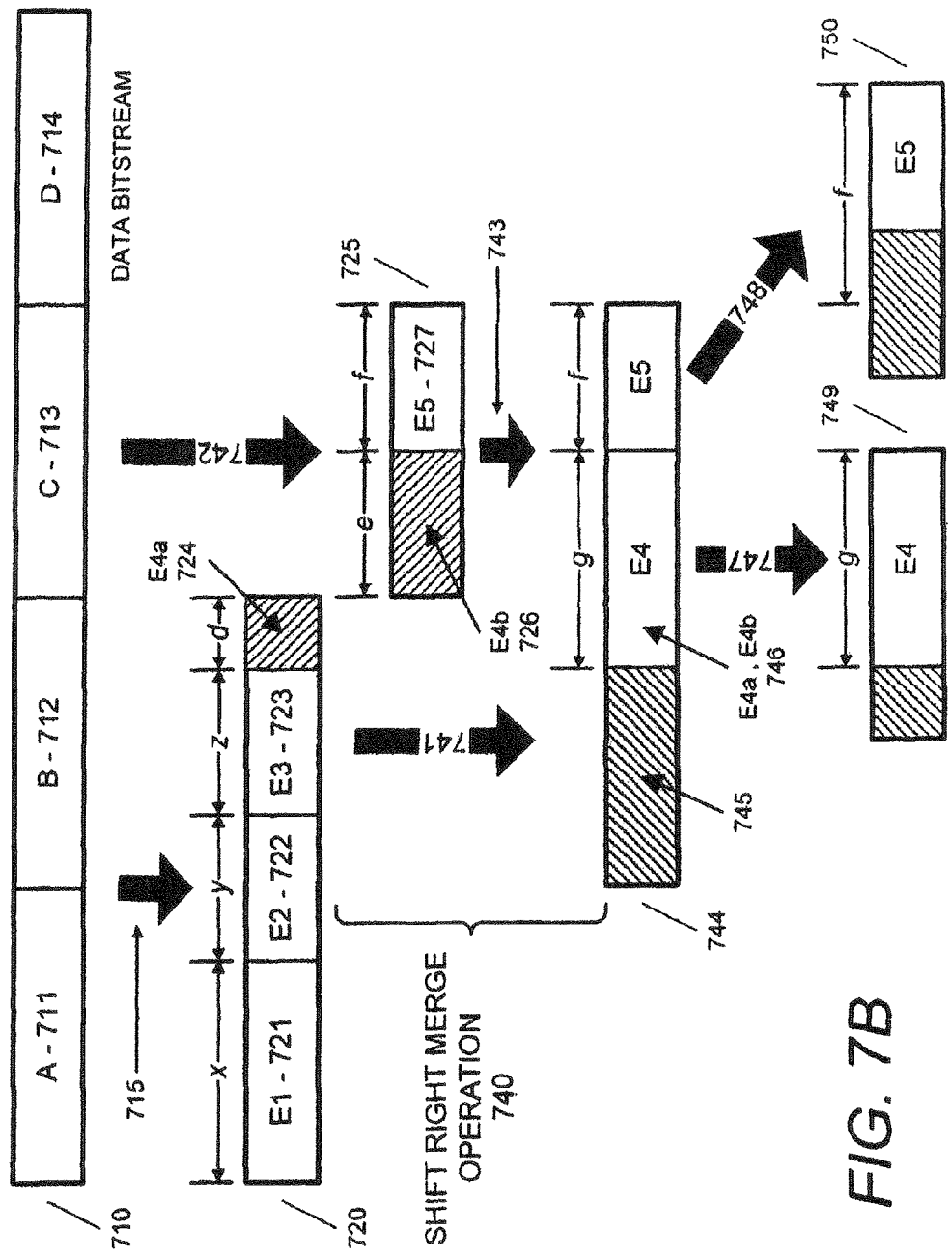
FIG. 7B further illustrates the operation from FIG. 7A for a bitstream buffer manipulation in accordance with the present invention.

FIGS. 7A-B illustrate the extraction of symbols having varying bit granularity from a bitstream. FIG. 7A illustrates a scenario for a bitstream buffer manipulation with a SIM shift merge instruction in accordance with one embodiment of the present invention where a sufficient number of unprocessed data bits from the bitstream are available in the temporary bitstream buffer. In this embodiment, multimedia data for an audio and/or video is communicated along a data bitstream 710. Depending on the particular implementation, bitstream 710 can be a live stream of data or a stream of data presently located within memory. The portion of bitstream 710 in this example includes data blocks A 711, B 712, C 713, and D 714. Although a limited number of data blocks are shown for the bitstream 710, the bitstream can be considered as having a plurality of additional other data blocks or treated as a long stream of data being fed from a source. The data blocks here can be of any predetermined size. For one embodiment, each data block is a doubleword wide. Data is loaded 715 from the bitstream 710 to a temporary bitstream buffer 720. This temporary buffer 720 can be a memory location or a register, such as a 64-bit MMX register or a 128-bit XMM register. For this example, the buffer 720 is a 64-bit SIMD register that can hold two data blocks worth of bitstream data. Data for the two data blocks A 711 and B 712 are shown loaded 715 into buffer 720.

The contents of the temporary buffer 720 as shown in FIG. 7A includes three complete symbols (E1 721, E2 722, E3 723) and a portion of another symbol (E4a 724). Note that these symbols are of varying length. Symbol E1 721 is comprised of x-bits, symbol E2 722 is comprised of y-bits, and symbol E3 723 is comprised of z-bits. For one embodiment, the algorithm tracks the number of bits that are processed from the buffer 720 for each symbol is extracted and also keeps a tally of the remaining number of unprocessed bits remaining in the buffer 720. During the symbol extraction algorithm, each symbol is copied or shifted from the temporary buffer 720 into a destination such as a general purpose register. The general purpose registers 734, 735, 736, here are of smaller size than the buffer 720 and can be used to further manipulate the extracted symbols. However, as the symbol size can vary, not all the bits in a register may be needed and certain unused bits can be zeroed or ignored. These unused bit locations are illustrated as cross hatching in registers 734, 735, 736. In this embodiment, all of the symbols that have all its respective bits from the bitstream 710 present in the temporary buffer 720, are extracted out. Thus the x-bits of symbol E1 721 are extracted 731 to a first register 734, the y-bits of symbol E2 722 are extracted 732 to a second register 735, and the z-bits of symbol E3 723 are extracted 733 to a third register 736. As for the symbol E4a 724 that does not have all its needed bits available from the bitstream 720 in the temporary buffer 720, that symbol can not be extracted just yet. Additional data bits have to be loaded from bitstream 720 into the buffer 720 and merged with the remaining unprocessed bits, the partial symbol bits for E4a 724 in this case.

FIG. 7B further illustrates the related scenario from FIG. 7A for manipulating a bitstream buffer in accordance with one embodiment of the present invention wherein an insufficient number of unprocessed data bits from the bitstream are available in the temporary bitstream buffer. Here, an additional thirty two bits for the next data block C 713 in the bitstream 710 have to be loaded and merged with the remaining unprocessed bits for E4a 724 that already reside in the temporary bitstream buffer 720. Like elements from FIG. 7A are similarly labeled in FIG. 7B. As from above, symbols E1 721, E2 722, and E3 723 that were located in data blocks A 711 and B 712 are extracted from the temporary bitstream buffer 720. An examination of C 713 of this example can show that partial symbol E4b 726 having e-bits and other bits of other symbols, such as symbol E5 727, are located within the block 713. In this example, E5 727 happens to fall on a 32 bit boundary. Although the data block C 713 as shown in this instance appears less than a full register length of data, the amount of data loaded from the bitstream to a register in performing a merge operation can vary based on the amount of data needed. In one embodiment, a sufficient amount of data is loaded from the bitstream 710 each time to fill a register.

Partial symbols E4a 724 and E4b 726 together form a complete symbol E4 746. In order to correctly extract the symbol E4 724, the partial bits from E4a 724 and E4b 726 have to be properly joined together. The use of a shift merge operation 740 allows for the merging of blocks of data from temporary buffer 720 and block C 713 of bitstream 710. In this embodiment, the shift merge operation is performed at a byte granularity along byte boundaries. For the example of FIG. 7B, the shift count is four because data block C 713 is a doubleword, or four bytes, in length. Thus, a doubleword containing E4a 724 is shifted 741 and merged 743, with the doubleword that includes E4b 726 into a temporary bitstream buffer 744. For one embodiment, buffers 720 and 744 can be the same buffer. Note that the shift merge operation 740 caused the doubleword B 712 from buffer 720 to shift to the upper portion of the destination buffer 744 and doubleword C 713 was shifted into the lower portion, while the two portions were properly merged together at the middle.

The contents of this temporary buffer 744 includes 'do not care' bits 745, the now complete symbol E4 746, and other symbols, such as symbol E5 727. In this example, the 'do not care' bits 745 can include parts or all of E2 722 or E3 723, depending on where the merge occurs. Symbol E4 746 is comprised of g-bits and E5 727 is comprised of f-bits. In this example, g of E4 746 is equal to the sum of d and e for E4a 724 and E4b 726, respectively. The variable length decoding algorithm extracts the complete symbols from buffer 744. Thus the g-bits of merged symbol E4 746 are extracted 747 to a fourth register 749 and the f-bits of symbol E5 727 are extracted 748 to a fifth register 750. Depending on the symbol size, not all of the bits in a register may needed. Unused bit locations are shown in cross hatch in registers 749, 750.

Although a plurality of the symbols in FIGS. 7A-B, such as E1 721, were byte aligned, a number, such as E 2 722 and E3 733, are not. Furthermore, the bit granularity of the symbol length can cause symbol boundaries to exist at inconvenient places. Whereas byte boundaries can be easily handled, data not byte aligned may not be as easily handled without a shift merge type of operation to synchronize and merge broken up symbols such as E4 746. Depending on the particular embodiment, additional features can be implemented to further enhance performance. For instance, the shift merge instruction and the shift merge operation as described in the examples above can also be implemented with bit granularity. Thus the shift merge operation can better focus on the bits of interest when loading data from the bitstream, instead of having to operate at byte aligned boundaries. Similarly, a shift merge instruction can be tuned to operate specifically with four or six byte operands at predetermined memory address boundaries to minimize the address calculations for memory loads during the data merge. For instance, a four byte operand shift merge instruction could be used in the example FIG. 7B as the blocks of data from the bitstream 710 are a doubleword in length.

Figure 8A:
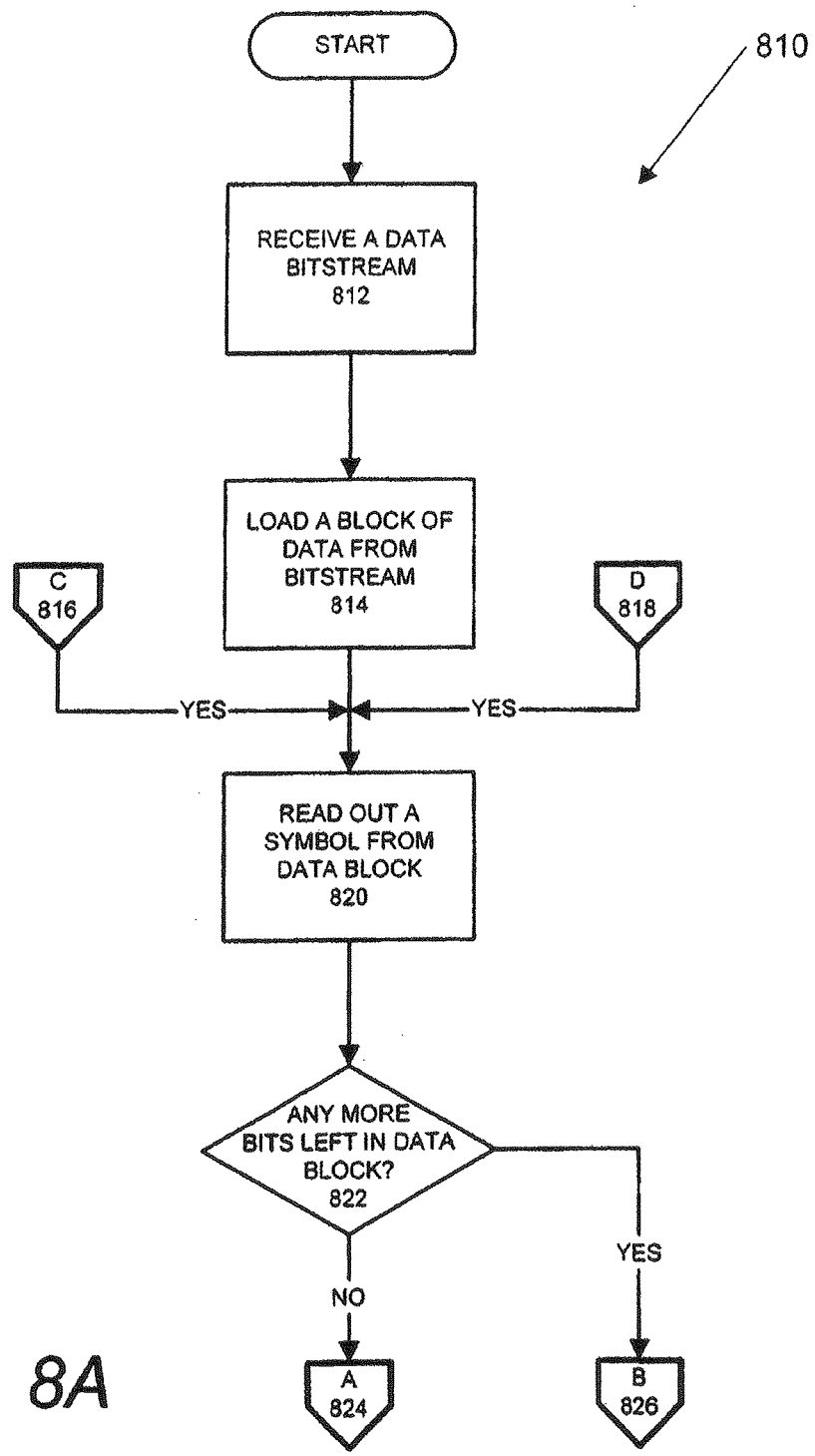
FIGS. 8A-C are flowcharts illustrating one embodiment of a method to manipulate a bitstream buffer with a SIMD merge instruction.
Figure 8B:
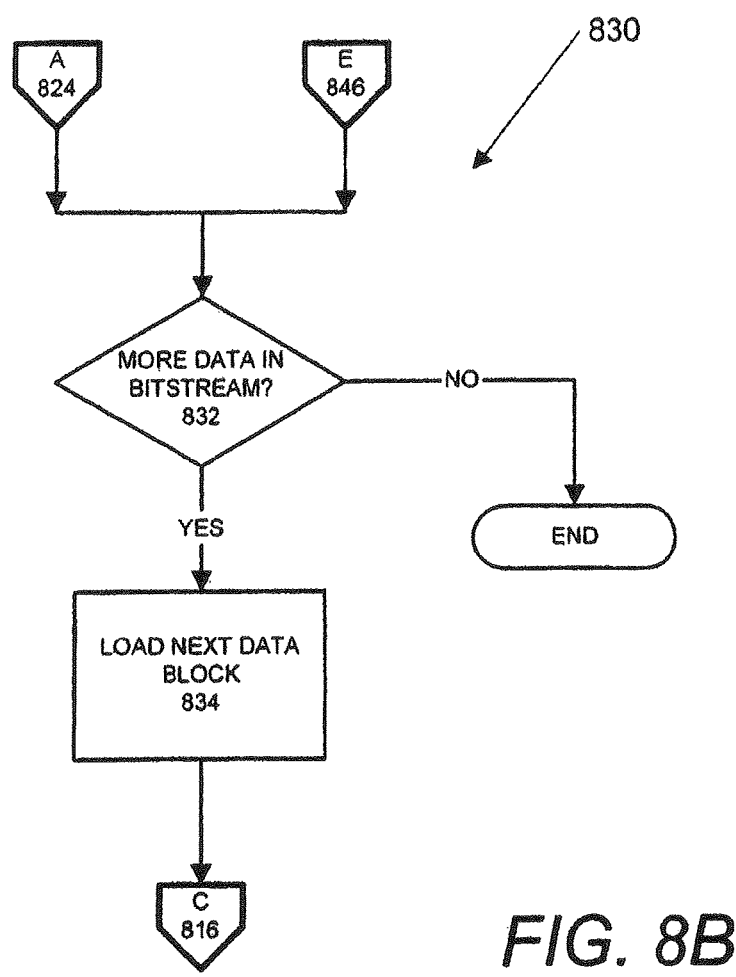
Figure 8C:
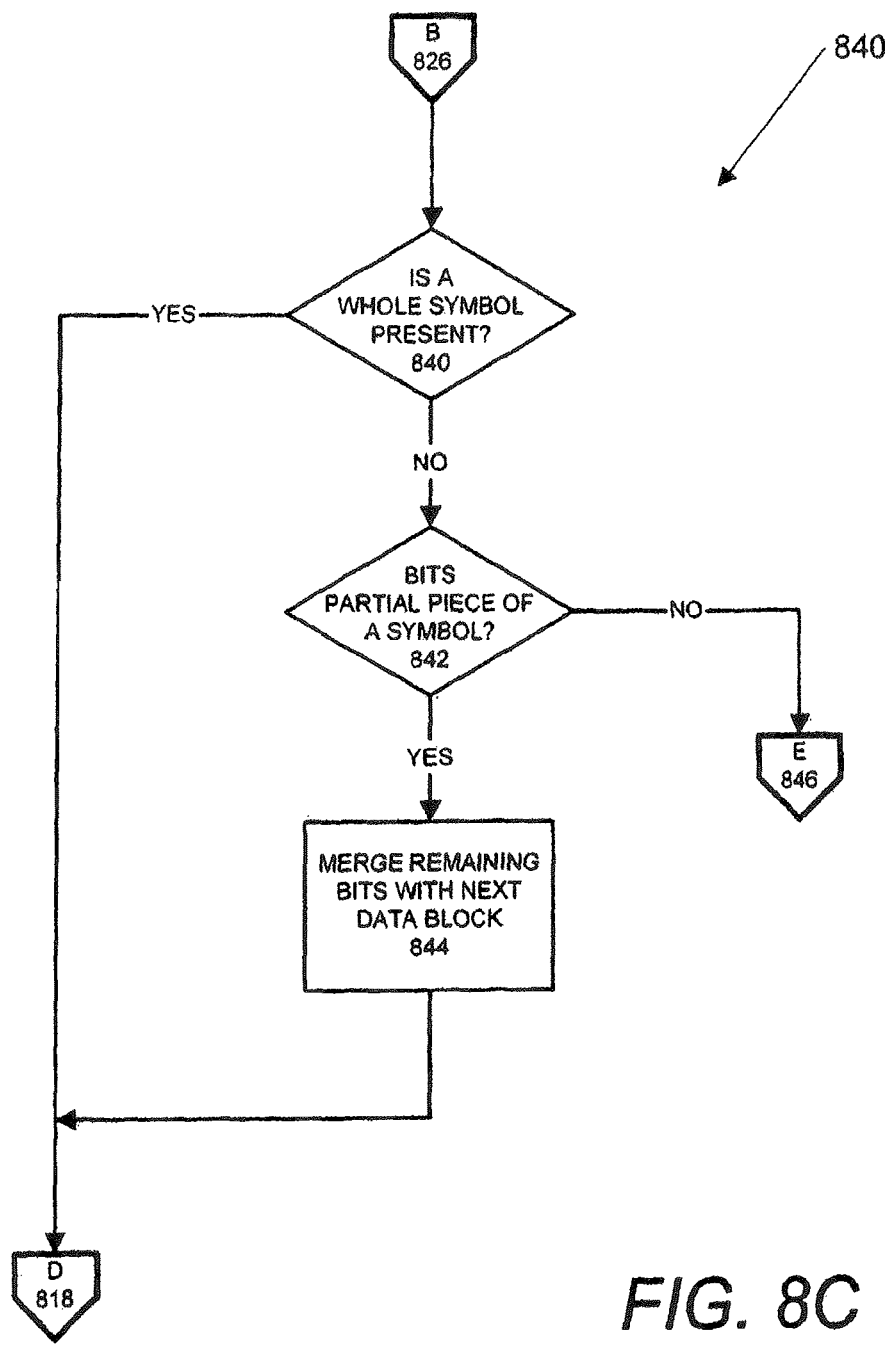

FIGS. 8A-C are flowcharts illustrating one embodiment of a method to manipulate a bitstream buffer with a SIMD merge instruction. The flowchart 810 at FIG. 8A illustrates a first portion of the algorithm for one embodiment. At block 812, a bitstream of data is received. A block of data is loaded from the bitstream at block 814. Depending on the implementation, the bitstream can be located in a type of memory. The number of data blocks that can be loaded can vary based on the size of the temporary buffer used to hold data bits for processing and symbol extraction. At block 820, a symbol is read out from the loaded data. For this embodiment, each symbol read out is complete in terms of its data bits and the symbol is sent to a register for further processing or use. A check is made at block 822 as to whether any more unprocessed data bits are left in the buffer.

If the determination at block 822 is that no unprocessed bits are left, the flow proceeds to tab A 824 of the flowchart 830 in FIG. 8B. Tab A 824 leads to block 832, where a check is made as to whether more data is available in the bitstream. If no more bitstream data is present for processing, the algorithm is done. But if the determination is that more bitstream data is available at block 832, the next block of data is loaded at block 834 for processing. In this instance, because no residual unprocessed bits were left in the buffer from the previously loaded data, a shift merge is not needed and the newly loaded data can be operated on. The flow proceeds to tab C 816, which jumps back to reading out a symbol from the buffer at block 820. Thus the variable length decoding to extract symbols continues.

If the determination at block 822 is that unprocessed bits are available, the flow proceeds to tab B 826 of the flowchart 840 in FIG. 8C. Tab B 825 lead to block 840, where a check is made as to whether a whole symbol is present within the unprocessed bits. If a whole symbol is present at block 840, the flow proceeds to tab D 818, which jumps back to reading out a symbol from the buffer at block 820. Thus the symbol extraction can continue on the presently loaded data. But if the determination at block 840 is that no whole symbol is present in the loaded data, a check is made at block 842 as to whether a partial piece of a symbol is located within the unprocessed bits. If the finding at block 842 is that no partial piece of a symbol is present in the unprocessed bits, meaning that the remaining bits may be invalid or unrecognized, the flow proceeds to tab E 846. Tab 846 leads back to block 832 to determine if more data is available in the bitstream and the decoding/extraction algorithm continues. If the finding at block 842 is that a partial symbol is present in the unprocessed bits, the next data block is loaded and these remaining unprocessed bits are merged with that data block. The flow continues back to tab D 818, which reads out a next symbol from the merged symbol data at block 820. For this situation, the next symbol at block 820 is the merged result of the partial symbol bits from block 842 and the corresponding partial symbol bits that were loaded with the bitstream data from block 844. The symbol extraction algorithm continues from block 820.

Thus, techniques for a method for bitstream buffer manipulation with a SIMD merge instruction are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
  a decoder to decode packed data instructions including a Single Instruction Multiple Data (SIMD) instruction specifying a first 64-bit operand comprising a first eight byte elements, a second 64-bit operand comprising a second eight byte elements, and an immediate value to specify a number (n) of bytes;
  a plurality of registers comprising at least one register to store the first eight byte elements and the second eight byte elements; and
  an execution unit coupled with the decoder and the plurality of registers, the execution unit in response to the SIMD instruction to store a 64-bit result in a destination indicated by the SIMD instruction,
  wherein the result is to include the number (n) least significant byte elements of the second operand in the number (n) most significant bytes of the result,
  concatenated with eight minus the number (n) most significant byte elements of the first operand in eight minus the number (n) least significant bytes of the result,
  wherein the processor is configured to be coupled with a memory interface, and
  wherein the processor is configured to be coupled with a Bluetooth interface.

2. The processor of claim 1, wherein the SIMD instruction is to cause the processor to perform a shift merge operation.

3. The processor of claim 1, wherein the SIMD instruction comprises a shift merge instruction.

4. The processor of claim 1, wherein the processor comprises a system on a chip.

5. The processor of claim 4, wherein the system on a chip comprises a memory controller.

6. The processor of claim 1, wherein the processor is a SIMD coprocessor.

7. The processor of claim 1, implemented in a system that further comprises a wireless receiver coupled with the processor.

8. The processor of claim 7, wherein the system further comprises a wireless transmitter coupled with the processor.

* * * * *